(12) United States Patent
Takeuchi

(10) Patent No.: US 7,595,599 B2
(45) Date of Patent: Sep. 29, 2009

(54) DRIVE REGENERATIVE CONTROL SYSTEM

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/135,567

(22) Filed: Jun. 9, 2008

(65) Prior Publication Data

US 2008/0246423 A1 Oct. 9, 2008

Related U.S. Application Data

(60) Continuation of application No. 11/888,869, filed on Aug. 2, 2007, now Pat. No. 7,436,137, which is a division of application No. 11/120,863, filed on May 3, 2005, now Pat. No. 7,279,858.

(30) Foreign Application Priority Data

May 18, 2004 (JP) .............................. 2004-148274

(51) Int. Cl.
*H02P 3/14* (2006.01)
*H02P 3/18* (2006.01)
(52) U.S. Cl. .................. 318/376; 318/139; 318/140; 318/599; 318/811
(58) Field of Classification Search .................. 318/376, 318/139, 140, 599, 811
See application file for complete search history.

(56) References Cited

U.S. PATENT DOCUMENTS

| 3,832,581 A | 8/1974 | Hoffmann et al. |
|---|---|---|
| 4,358,693 A | 11/1982 | Palmer et al. |
| 4,782,255 A | 11/1988 | Oosaka et al. |
| 6,123,163 A | 9/2000 | Otsu et al. |
| 6,137,250 A | 10/2000 | Hirano et al. |

(Continued)

FOREIGN PATENT DOCUMENTS

| JP | 04-101602 | 4/1992 |
|---|---|---|
| JP | 08-051745 | 2/1996 |
| JP | 3057913 | 3/1999 |
| JP | 2001-224103 | 8/2001 |
| JP | 2006-505236 | 2/2006 |
| WO | WO 02/087066 | 10/2002 |

OTHER PUBLICATIONS

Communication (and translation) from Japanese Patent Office re: related application.

*Primary Examiner*—Bentsu Ro
*Assistant Examiner*—Erick Glass
(74) *Attorney, Agent, or Firm*—Harness, Dickey & Pierce, P.L.C.

(57) ABSTRACT

Provided is a drive regenerative control system of a drivee with a motor superior in torque and weight balance and suitable for miniaturization as the drive source. In a drive regenerative control system having a drive source with an electric motor, a drivee, a control circuit having a drive control circuit of the motor and a regenerative control circuit, and a detection unit for detecting the driving status of the drivee, the drive control circuit and regenerative control circuit have a control unit for controlling, linearly or in multiple stages, the duty ratio of the drive or regenerative signal to be supplied to the motor based on the phase difference of the phase of the detection signal from the detection unit and the command value signal to the motor.

2 Claims, 26 Drawing Sheets

U.S. PATENT DOCUMENTS

| | | |
|---|---|---|
| 6,140,780 A | 10/2000 | Oshima et al. |
| 6,318,487 B2 | 11/2001 | Yanase et al. |
| 6,414,453 B1 | 7/2002 | Tamagawa et al. |
| 6,445,105 B1 | 9/2002 | Kliman et al. |
| 6,573,675 B2 | 6/2003 | Schmitz et al. |
| 6,988,570 B2 | 1/2006 | Takeuchi |
| 2005/0189894 A1 | 9/2005 | Komiyama et al. |
| 2006/0103338 A1 | 5/2006 | Takeuchi |

FIG. 20

| STATUS | TABLE NAME | DRIVE MODE | REGENERATIVE MODE | INTERNAL COMBUSTION | MECHANISM BRAKING | COMMAND STATUS OF MOVABLE BODY | ROAD CONDITION |
|---|---|---|---|---|---|---|---|
| DRIVE | AH1 | A PHASE/B PHASE | — | ON | — | ACCELERATION 1, START | UPHILL |
| DRIVE | AH2 | A PHASE | — | — | — | ACCELERATION 2 | UPHILL |
| STABLE | BH | A PHASE | B PHASE | ON | — | CONSTANT SPEED | LEVEL |
| REGENERATIVE | CH2 | — | A PHASE | — | — | BRAKING 2 | DOWNHILL |
| REGENERATIVE | CH1 | — | A PHASE/ B PHASE | — | ON | BRAKING 1, STOP | DOWNHILL |
| FORCED BRAKING | DH | A/B PHASE (REVERSE DRIVE) | — | — | ON | FORCED BRAKING, EMERGENCY STOP | — |

FIG. 28

| STATUS | TABLE NAME | DRIVE UNIT/ DRIVE MODE | DRIVE UNIT/ REGENERATIVE MODE | INTERNAL COMBUSTION | MECHANISM BRAKING | COMMAND STATUS OF MOVABLE BODY | ROAD CONDITION |
|---|---|---|---|---|---|---|---|
| DRIVE | AH1 | FIRST: A/B PHASE SECOND: A PHASE | — | ON | — | ACCELERATION 1, START | UPHILL |
| DRIVE | AH2 | FIRST: A/B PHASE | — | — | — | ACCELERATION 2 | UPHILL |
| DRIVE | AH3 | FIRST: B PHASE | — | — | — | ACCELERATION 3 | UPHILL |
| DRIVE | AH4 | FIRST: A PHASE | — | — | — | ACCELERATION 4 | UPHILL |
| STABLE | BH1 | FIRST: A/B PHASE | SECOND: A PHASE | ON | — | CONSTANT SPEED 1 | LEVEL |
| STABLE | BH2 | SECOND: A PHASE | FIRST: A/B PHASE | ON | — | CONSTANT SPEED 2 | LEVEL |
| STABLE | BH3 | FIRST: A PHASE | SECOND: A PHASE | ON | — | CONSTANT SPEED 3 | LEVEL |
| REGENERATIVE | CH4 | — | FIRST: A PHASE | — | — | BRAKING 4 | DOWNHILL |
| REGENERATIVE | CH3 | — | FIRST: B PHASE | — | — | BRAKING 3 | DOWNHILL |
| REGENERATIVE | CH2 | — | FIRST: A/B PHASE | — | — | BRAKING 2 | DOWNHILL |
| REGENERATIVE | CH1 | — | FIRST: A/B PHASE SECOND: A PHASE | — | ON | BRAKING 1, STOP | DOWNHILL |
| FORCED BRAKING | DH | A PHASE/B PHASE (REVERSE DRIVE) | — | — | ON | FORCED BRAKING, EMERGENCY STOP | — |

DRIVE AND BRAKE CONTROL TIMING CHART BASED ON PHASE

DRIVE REGENERATIVE CONTROL SYSTEM

CROSS REFERENCE TO RELATED APPLICATIONS

This application is a continuation patent application of U.S. Ser. No. 11/888,869 filed Aug. 2, 2007, which is a divisional of U.S. Ser. No. 11/120,863 filed May 3, 2005, now U.S. Pat. No. 7,279,858, issued Oct. 9, 2007, claiming priority to Japanese Patent Application No. 2004-148274 filed May 18, 2004, all of which are incorporated by reference.

BACKGROUND OF THE INVENTION

1. Field of the Invention

The present invention relates to a drive regenerative control system for driving a drivee by employing an electric motor as the drive source. As the drivee, considered may be an automobile, aircraft, ship and so on. The present invention also relates to a drive regenerative control system in a hybrid system simultaneously using an internal combustion and electric motor.

2. Description of the Related Art

Conventionally, as this type of drive control system, for instance, there is a drive control system described in the gazette of WO 02/087066 (Patent Document 1). This drive control device for controlling the electromotive rotation drive unit for moving a driver comprises a reference comparative signal generation circuit, a detection circuit for detecting the speed of the driver and outputting this as a detection signal, a speed designation circuit of the driver, a rotation control circuit of the driver, and a phase comparison circuit for comparing the phase of the reference comparative signal and the phase of the detection signal and outputting the comparison result to the rotation control circuit, wherein the rotation control circuit performs PLL (Phase-Locked Loop) control so as to match the speed of the driver with the speed designated based on the phase comparison result.

An AC motor used in this drive control system which is driven with a frequency signal such as an alternating current can be broadly classified into two types; namely, a synchronous motor and an induction motor. A synchronous motor is a motor that uses a layered core of a permanent magnet or a ferromagnetic material such as iron in the rotor, and rotates at a rotation speed that is the same as the speed of the rotating magnetic field determined based on the power supply frequency.

Depending on the type of rotor, there are various types of motors such as a magnetic type which uses a permanent magnet, a coil type with a coil wound thereto, and a reactance type which uses a ferromagnetic material such as iron. Among the above, the magnetic type motor rotates by the permanent magnet of the rotor being pulled with the rotating magnetic field of the stator. Meanwhile, the induction motor is a motor that rotates by generating a separate magnetic field with the electromagnetic induction effect to a rotor having a box-shaped conduction wire.

Among the foregoing motors, there is a motor that does not rotate, but rather moves linearly or moves freely on a flat surface. This kind of motor is generally referred to as a linear motor, and moves the permanent magnet or ferromagnetic material mounted thereon by linearly arranging coils that generate magnetic poles and sequentially switching the current to be applied to the coil. The linearly disposed coil array is the stator, and the rotor corresponds to a flat slider that slides thereabove.

As a magnetic synchronous motor, for instance, there is a small synchronous motor described in the gazette of Japanese Patent Laid-Open Publication No. H8-51745 (Patent Document 2). This small synchronous motor, as shown in FIG. 1 of Patent Document 2, is constituted by comprising a stator core 6 wound with an excitation coil 7, and a rotor 3 having a rotor core 2 with a magnet 1 build therein and in which the NS poles are aligned in even intervals around the peripheral face thereof.

SUMMARY OF THE INVENTION

Nevertheless, with the motor explained in the description of the related art, the weight became massive in comparison to the generated torque, and there is a problem in that the motor would become enlarged when attempting to increase the generated torque. Further, with the conventional technology, it is not possible to control the electric motor torque in multi stages or linearly. Thus, an object of the present invention is to provide a system employing a motor suitable for miniaturization and superior in torque and weight balance for the drive control and regenerative control of the drivee. Moreover, the present invention provides a system enabling the multistage or linear control of the electric motor torque to be used for driving the drivee.

In order to achieve the foregoing objects, the present invention provides a drive regenerative control system, comprising: a drive system for driving a drivee in which an electric motor is combined with another drive source as necessary; a mechanism for transmitting the driving force from the drive system to the drivee; an electric motor operation control circuit for controlling the drive and regeneration of the electric motor; a storage mechanism for storing regenerative energy; a storage control circuit; a sensor for detecting the motion of the drivee; and an operation control device for outputting a drive control signal to the electromotive drive system based on the sensor output; wherein the electric motor has a movable body constituted from a magnetic body, and a plurality of phase coils, and the operation control device controls one or a plurality of the phase coils for driving and/or regeneration according to the operation status of the drivee.

In an embodiment of the present invention, the other drive source is an internal combustion, the drivee is a running vehicle, and a plurality of the storage mechanisms is provided. Further, the storage control circuit selects a mechanism suitable for charging with regenerative energy, and charges the storage mechanism with the regenerative energy. Moreover, the motor establishes a stator by forming a plurality of phase coils with a plurality of coil arrays to be excited at alternate opposite poles in relation to a rotor as the movable body formed by continuously disposing a plurality of permanent magnets magnetized at alternate opposite poles, disposes the stator without contacting the rotor, and rotates the rotor by supplying to the coils a pulse signal wave having a frequency.

Further, when the drivee is running on a low load, the operation control device performs control so as to simultaneously use a part of the plurality of phase coils for driving and the other phase coils for regeneration. The electric motor operation control circuit has a comparison circuit for comparing the detection signal and reference signal obtained based on the sensor output, forms a drive control signal of the electric motor of the electric motor based on the comparison result and supplies this to the drive circuit of the electric motor, and further forms the regenerative control signal based on the comparison result and supplies this to the storage control unit. The comparison circuit compares the phase of the detection signal and reference signal, and the drive control signal or regenerative control signal is formed based on the phase difference. The electric motor operation control circuit determines the duty ratio of the drive signal of the electric motor to be supplied to the drive circuit based on the phase difference, and determines the duty ratio of the regenerative enabling signal to be supplied to the storage control unit based on the phase difference. The combination of the phase coils to be drive controlled or regenerative controlled according to the operation status of the drivee is formed into a table and stored in the memory, and the operation control circuit refers to the memory to determine the phase coils to be excited based on the sensor output.

In addition, a magnetic sensor is further provided in relation to the movable body for each of the phase coils, and the electric motor operation control circuit determines the hysteresis level in relation to the output of the magnetic sensor based on the comparison result, and determines the duty ratio from the hysteresis level and the magnetic sensor output. The output of the sensor is directly supplied to the phase coils as an excitation current.

BRIEF DESCRIPTION OF THE DRAWINGS

FIG. 20 is a diagram representing the drive/regenerative state transition characteristics table of a vehicle (drivee);

FIG. 28 is a control table to be applied to the motor;

DETAILED DESCRIPTION OF THE PREFERRED EMBODIMENTS

Figure 1:
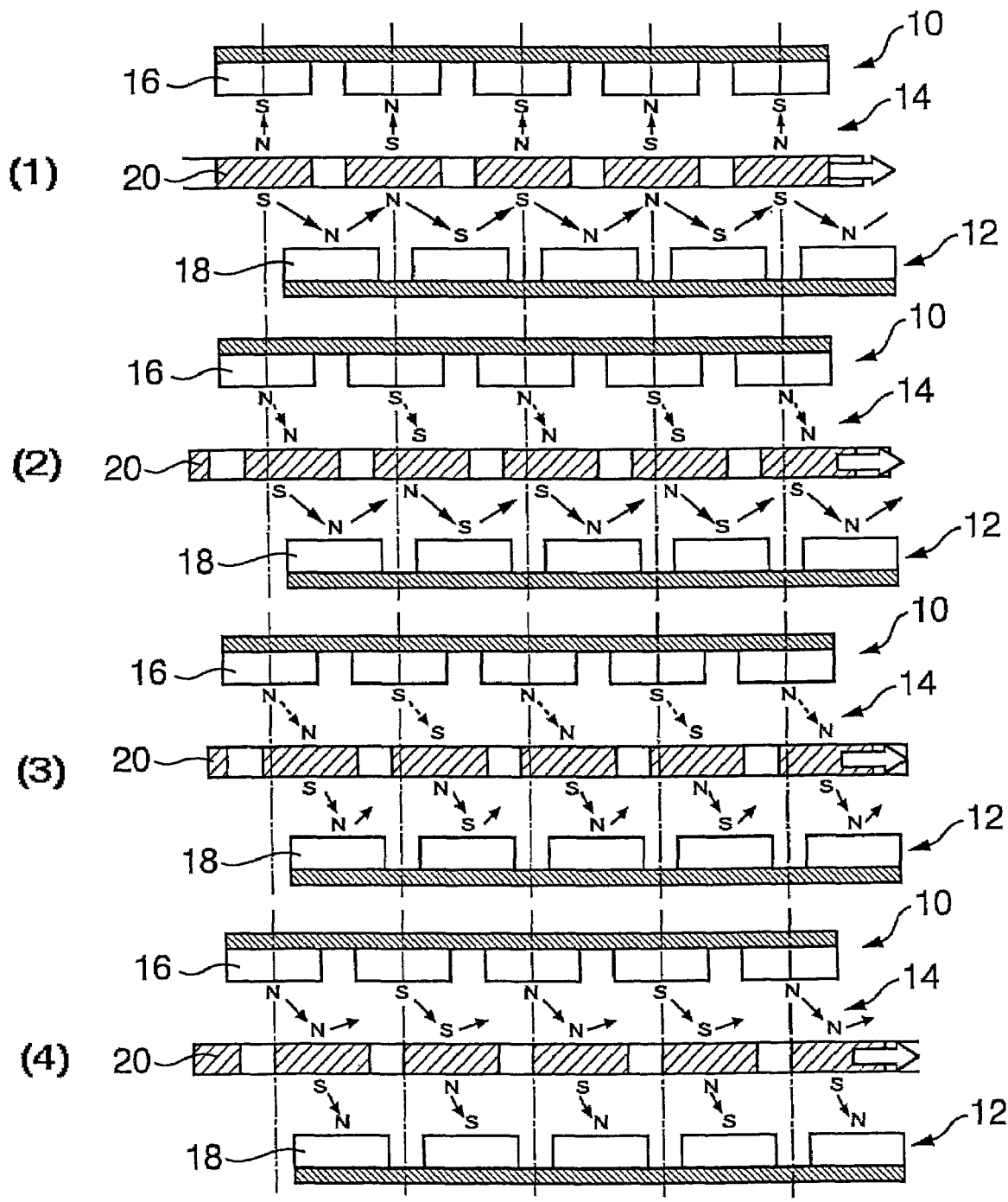
FIG. 1 is a diagram showing the frame format and principle of operation of the magnetic structure pertaining to the present invention.
Figure 2:
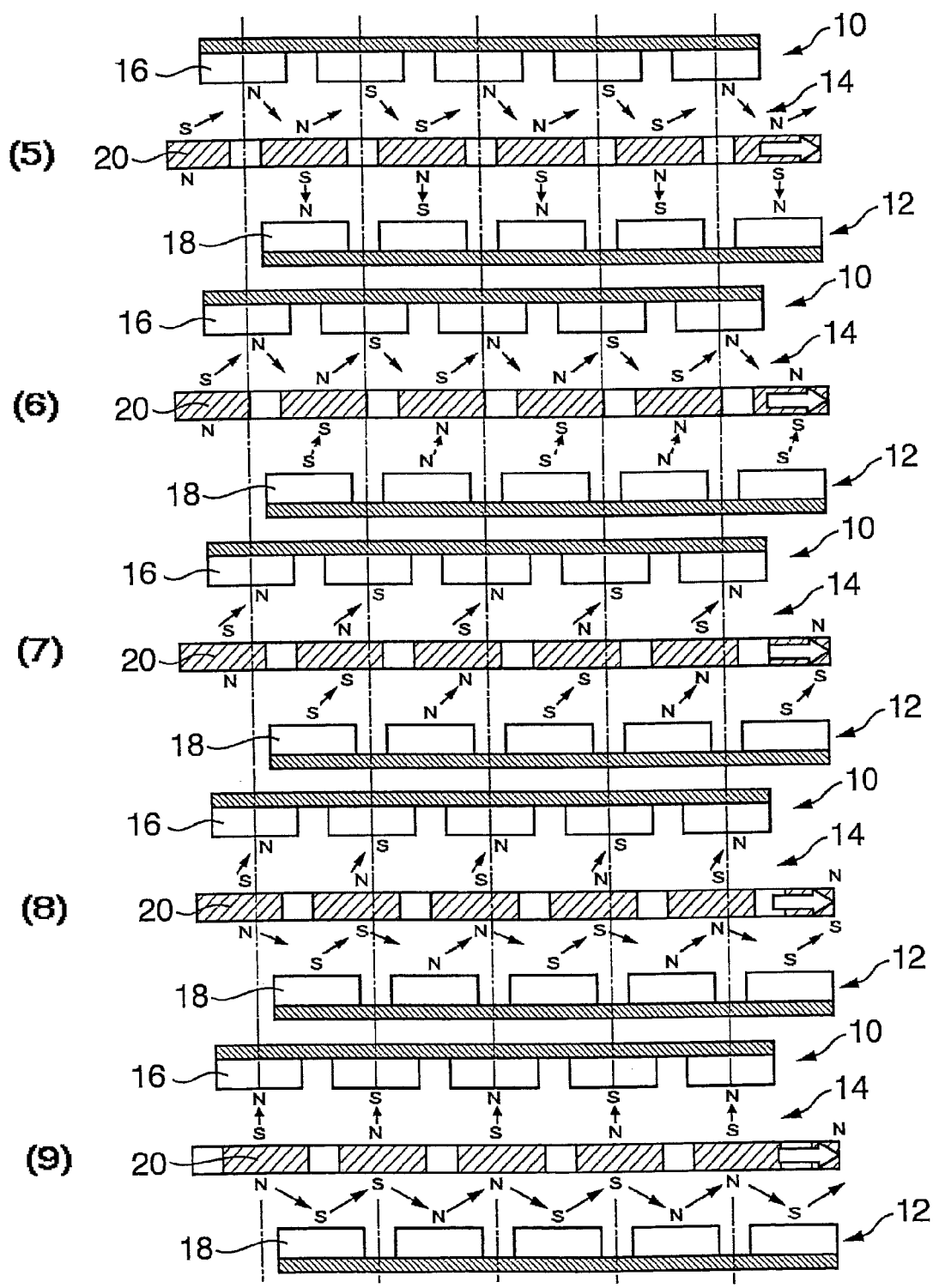
FIG. 2 is a diagram showing the principal of operation subsequent to FIG. 1.

FIG. 1 and FIG. 2 are diagrams showing the principal of operation of a representative motor pertaining to the present invention. This motor has a constitution where a third permanent magnet 14 is interposed between a first coil pair (A phase coil) 10 and a second coil pair (B phase coil) 12. The coils and permanent magnet may be constituted circularly (arc, circle) or linearly. When formed circularly, either the permanent magnet or the coil phase functions as the rotor, and, when formed linearly, one of the above becomes a slider.

Figure 5:
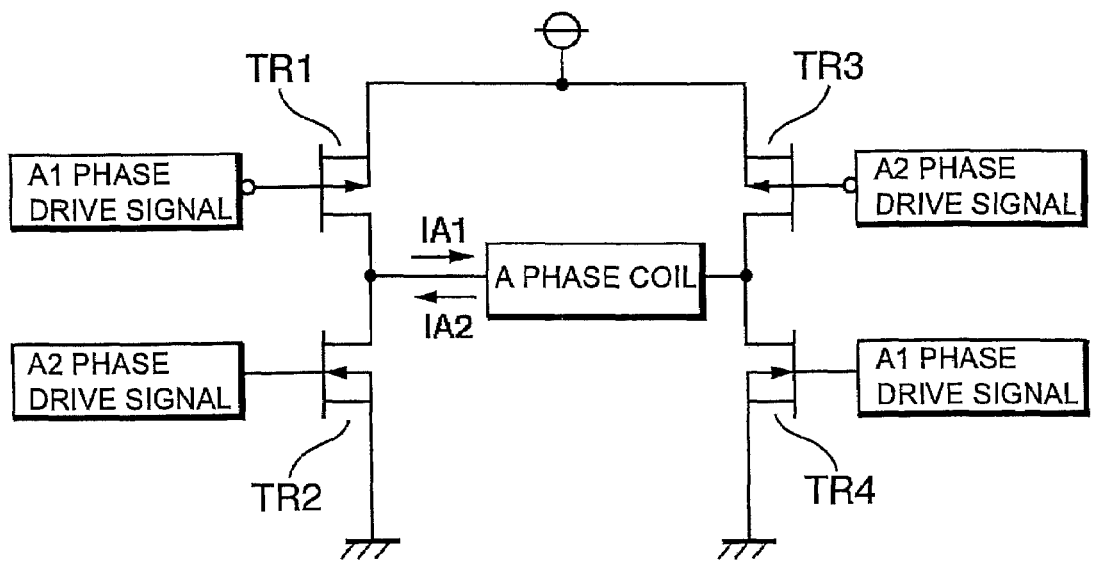
FIG. 5(1) and FIG. 5(2) are block diagrams of the drive circuit for supplying an excitation signal to a coil array.
Figure 5:
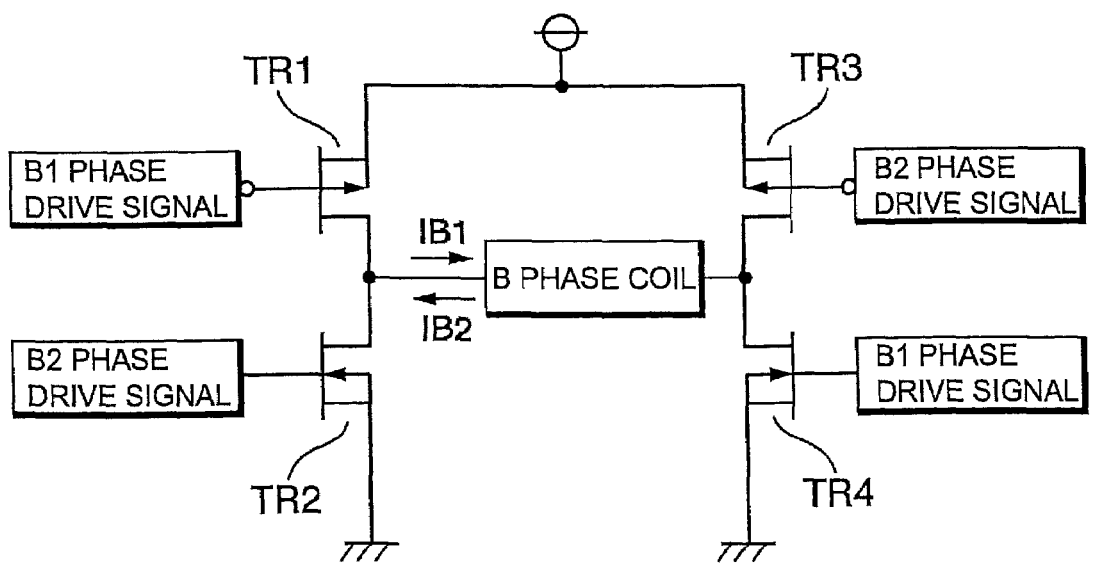

The first coil pair (phase coil) 10 comprises a constitution in which the coils 16 alternately excitable to the opposite poles are sequentially aligned in a prescribed spacing, preferably an even spacing. FIG. 5 is an equivalent circuit diagram of this first coil pair. According to FIG. 1 and FIG. 2, as described later, with a two-phase excitation coil, all coils are excited to be constantly driven against the two-phase exciting coil during the start-up rotation (2π) with the foregoing polarity. Therefore, a drivee means such as a rotor or slider can be rotated and driven at high torque.

Figure 3:
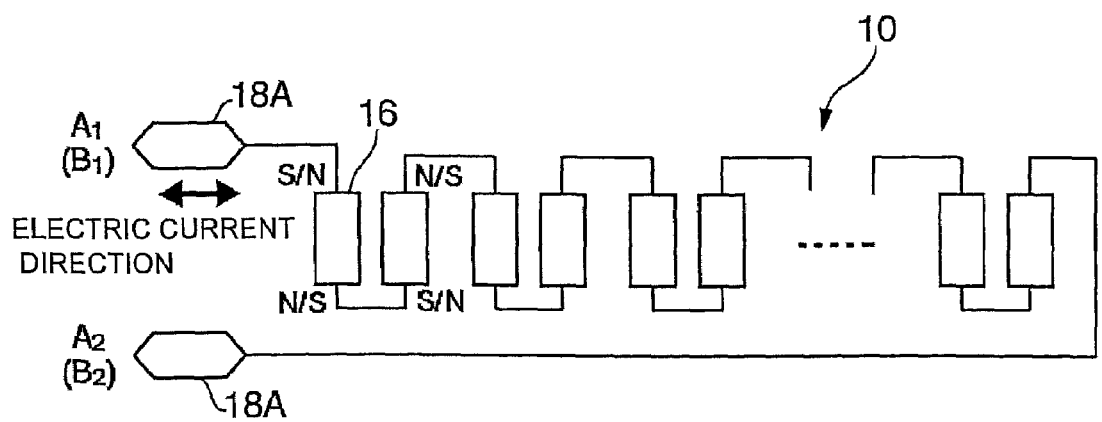
FIG. 3(1) and FIG. 3(2) are equivalent circuit diagrams showing the connection state of the electromagnetic coils.
Figure 3:
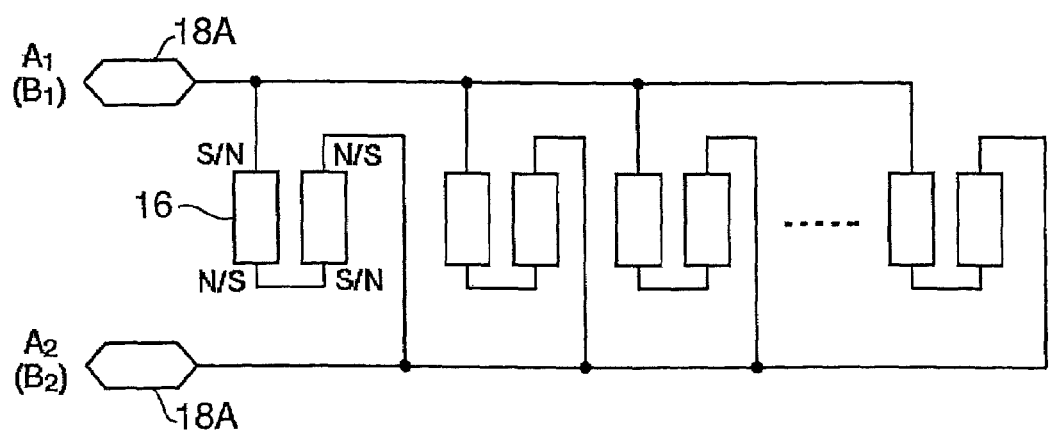

As shown in FIG. 3(1), a plurality of electromagnetic coils 16 (magnetic unit) to be alternately excited at opposite poles is connected serially in even spacing. Reference numeral 18A is a block showing the drive circuit for applying a frequency pulse signal to these magnetic coils. When an excitation signal for exciting the coils is sent from the excitation circuit to the electromagnetic coils 16, the respective coils are pre-set to be excited such that the direction of the magnetic poles will alternate between the adjacent coils. As shown in FIG. 3(2), the electromagnetic coils 16 may also be connected in parallel. The structure of these coils are the same for both A and B phase coils.

When a signal having a frequency for alternately switching, in prescribed cycles, the direction of the polarity of the supplied excitation current is applied from the excitation circuit 18A to the electromagnetic coils 16, as shown in FIG. 1 and FIG. 2, a magnetic pattern which alternately changes the polarity on the side facing the rotor 14 from N pole→S pole→N pole is formed in the A phase coil pair 10. When the frequency signal becomes a reverse polarity, a magnetic pattern is generated for alternately changing the polarity, which is on the third magnetic body side, of the first magnetic body from S pole→N pole→S pole. As a result, the excitation pattern appearing in the A phase coil pair 10 will periodically change.

Although the structure of the B phase coil pair is the same as the A phase coil pair, the electromagnetic coils 18 of the B phase coil pair differ with respect to the point that they are aligned by being positionally shifted in relation to the electromagnetic coils 16 of the A phase coil pair. In other words, the array pitch of the coil in the A phase coil pair and the array pitch of the B phase coil pair are disposed in an offset so as to have a prescribed pitch difference (electrical angular difference). This pitch difference is preferably the (single rotation) of the angle in which the permanent magnet 14 moves corresponding to 1 cycle ($2\pi$) of the excitation current frequency in relation to the coils 16, 18; for instance $\pi/6$ ($\pi/(2/M)$: M is the number of sets of permanent magnet (N+S) where M=3).

The permanent magnet is now explained. As depicted in FIG. 1 and FIG. 2, the rotor 14 formed from a permanent magnet is disposed between a two-phase coil pair, and a plurality of permanent magnets 20 (marked out in black) having alternately reverse polarities is aligned in a line (linearly or in an arc) in prescribed spacing, preferably in even spacing. An arc shape includes loops such as a perfect circle or an oval shape, as well as indefinite circular structures, half circles, fan shapes, and so on.

The A phase coil pair 10 and B phase coil pair 12 are disposed via equal spacing, and a third magnetic body 14 is disposed between the A phase coil pair and B phase coil pair. The array pitch of the permanent magnet 20 is roughly the same as the array pitch of the magnetic coil in the A phase coil 10 and B phase coil 12.

Next, the operation of the magnetic structure in which the foregoing third magnetic body is disposed between the first magnetic body 10 and second magnetic body 12 is explained with reference to FIG. 1 and FIG. 2. Let it be assumed that, based on the foregoing excitation circuit (reference numeral 18 illustrated in FIG. 3; to be described in detail later), the excitation pattern shown in FIG. 1(1) is being generated at a certain moment in the electromagnetic coils 16, 18 of the A phase coil and B phase coil.

Here, a magnetic pole in the pattern of →S→N→S→N→S→ is generated in the respective coils 16 on the surface facing the side of the permanent magnet 14 of the A phase coil 10, and a magnetic pole in the pattern of →N→S→N→S→N→ is generated in the coil 18 on the surface facing the side of the permanent magnet 14 of the B phase coil 12. In the diagrams, the magnetic relation between the permanent magnet and the respective phase coils is illustrated, and a repulsive force will arise between the same poles and an attractive force will arise between opposite poles.

The next instant, as shown in FIG. 1(2), when the polarity of the pulse wave applied to the A phase coil via the drive circuit 18 is reversed, a repulsive force will arise between the magnetic pole generated to the coils 16 of the A phase coil 10 and the magnetic pole of the permanent magnet 20. Meanwhile, since an attracting force is generated between the magnetic pole generated to the coils 18 of the B phase coil 12 and the magnetic pole on the surface of the permanent magnet, as shown in FIG. 1(1) to FIG. 2(5), the permanent magnet 14 will sequentially move rightward in the diagram.

A pulse wave having a phase lag in comparison to the exciting current of the A phase coil applied to the coils 18 of the B phase coil 12, and, as shown in FIG. 2(6) to (8), the magnetic pole of the coils 18 of the B phase coil 12 and the magnetic pole on the surface of the permanent magnets 20 repel against each other, and move the permanent magnet 14 further rightward. FIG. 1(1) to FIG. 2(8) illustrate a case where the rotor 14 engages in a rotation corresponding to $\pi$, and FIG. 3(9) onward illustrate a case where such rotor 14 engages in a rotation corresponding to $\pi$→$2\pi$. As described above, the rotor will rotate by supplying a drive current (voltage) signal of a prescribed frequency with a shifted phase to the A phase coil array and B phase coil array.

When the A phase coil array, B phase coil array and the permanent magnet are formed in an arc, the magnetic structure depicted in FIG. 1 will become a structure of a rotating motor, and, when these are formed linearly, the magnetic structure thereof will become a linear motor. Excluding the portions of the permanent magnet such as a case or rotor and the electromagnetic coil can be reduced in weight by employing a non-magnetic body such as resin (including carbon) or ceramics, and a rotating power drive superior in a power-weight ratio can be realized without generating iron loss as a result of opening the magnetic circuit without using a yoke.

According to this magnetic structure, since the permanent magnet is able to move upon being subject to the magnetic force from the A phase coil and the B phase coil, the torque upon moving the permanent magnet will increase, and, since the torque/weight balance will become superior, a small motor capable of driving at a high torque can be provided thereby.

FIG. 3(1) shows the respective circuits of the A phase coil and B phase coil in a case where the plurality of coil arrays is formed serially, and FIG. 3(2) shows the respective circuits of the A phase coil and B phase coil in a case where the plurality of coil arrays is formed in parallel.

Figure 4:
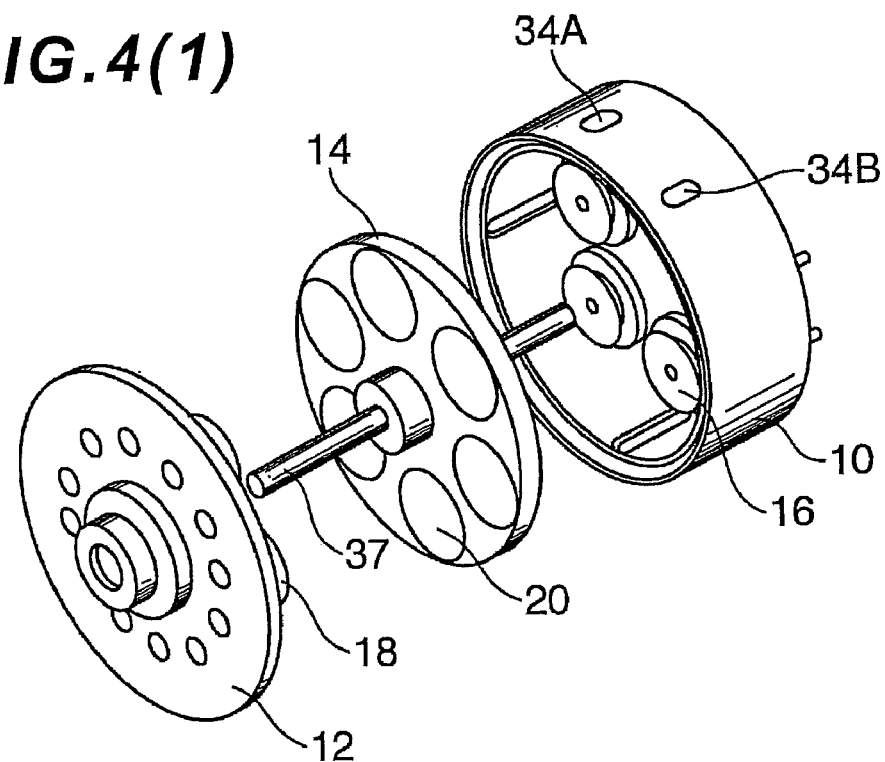
FIG. 4(1)~FIG. 4(5) are perspective views of the motor.
Figure 4:
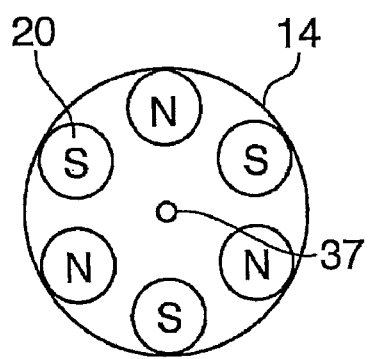
Figure 4:
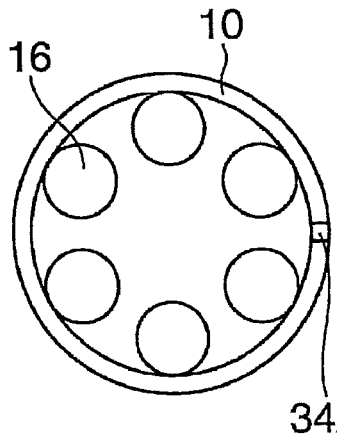
Figure 4:
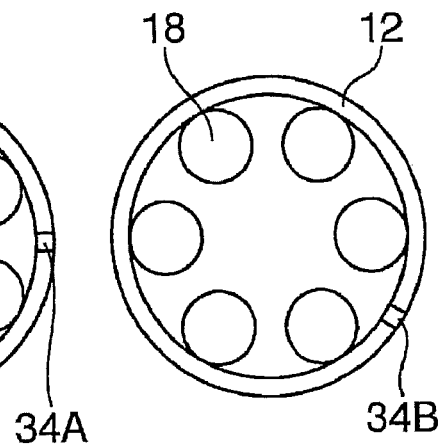
Figure 4:
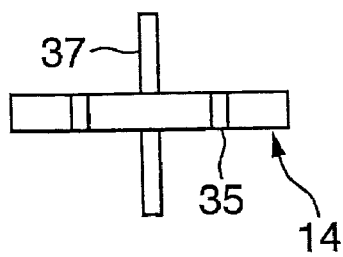

FIG. 4(1)~FIG. 4(5) are perspective views of the motor, wherein FIG. 4(1) is a perspective view of the motor; FIG. 4(2) is a schematic plan view of the rotor (third magnetic body); FIG. 4(3) is a side view thereof; FIG. 4(4) is a diagram showing an A phase electromagnetic coil (first magnetic body); and FIG. 4(5) is a diagram showing a B phase electromagnetic coil (second magnetic body). The reference numerals used in FIG. 4 are the same as the structural components corresponding to the foregoing diagrams.

The motor comprises a pair of A phase magnetic body 10 and B phase magnetic body 12 corresponding to a stator, as well as the third magnetic body 14 constituting the rotor, and a rotor 14 is rotatably disposed around the axis 37 and between the A phase magnetic body and B phase magnetic body. The rotating axis 37 is fitted into an opening in the center of the rotor such that the rotor and rotating axis can rotate integrally. As shown in FIGS. 4(2), (4) and (5), six permanent magnets are provided to the rotor in even spacing around the circumferential direction thereof, polarities of the permanent magnets are made to be mutually opposite, and six electromagnetic coils are provided to the stator in even spacing around the circumferential direction thereof.

The A phase sensor 34A and B phase sensor 34B are provided to the inner side wall of the case of the A phase magnetic body (first magnetic body) via a phase shift (distance corresponding to $\pi/6$). The A phase sensor 34A and B phase sensor 34B are subject to mutual phase shifts for providing a prescribed phase different to the frequency signal to be supplied to the A phase coil 16 and the frequency signal to be supplied to the B phase coil 18.

As the sensor, it is preferable to use a hall element employing the hall effect and which is capable of detecting the position of the permanent magnet from the change in the magnetic pole pursuant to the movement of the permanent magnet. As a result of employing this sensor, when the S pole of the permanent magnet to the subsequent S pole is set to $2\pi$, the hall element will be able to detect the position of the permanent magnet regardless of where the permanent magnet is located. As the hall element, a method of generating a pulse may be employed, or a method of outputting an analog value according to the magnetic pole intensity may also be employed.

FIG. 5(1) and FIG. 5(2) respectively show the drive circuits of the A phase magnetic body formed from an A phase coil array and the B phase magnetic body formed from a B phase coil array.

This circuit includes switching transistors TR1 to TR4 for applying the output waveform of the sensor as an excitation current to the A phase electromagnetic coil or B phase electromagnetic coil. Here, when the A phase sensor output as the signal is "H", "L" is applied to the TR1 gate, "L" is applied to the TR2 gate, "H" is applied to the TR3 gate, and "H" is applied to the TR4 gate. Then, TR1 and TR4 will be turned on, and the excitation current as the output from the sensor having an IA1 is applied to the A phase coil. Meanwhile, when then A phase sensor output as the signal is "L", "H" is applied to the TR1 gate, "H" is applied to the TR2 gate, "L" is applied to the TR3 gate, and "L" is applied to the TR4 gate. Then, TR2 and TR3 will be turned on, and the excitation current having an IA2 orientation will be applied to the A phase coil. Further, when "H" is applied to TR1 and TR3 and "L" is applied to TR2 and TR4, this will enter an HiZ state, and current will not be supplied to the electromagnetic coil. The same applies regarding the excitation to the B phase coil illustrated in FIG. 5(2).

Figure 6:
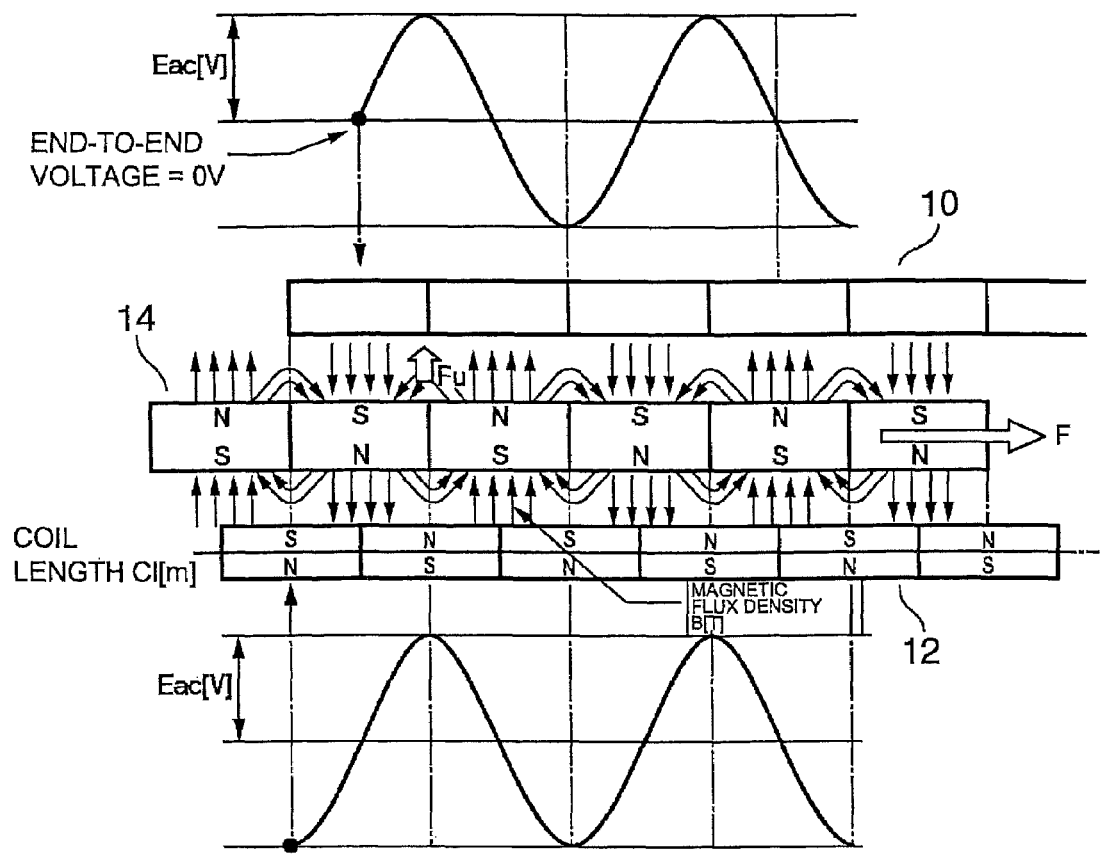
FIG. 6 is a diagram showing the frame format of the power generation principle of the motor.

FIG. 6 is a diagram showing the power generation principle during the regenerative control of the motor. The magnetic flux in the direction of the arrow shown in the diagram is generated between adjacent opposite poles to the movable body (rotor) between the A phase coil and B phase coil along the surface of the rotor. When the rotor rotates, the magnetic flux density in the coil changes periodically, and the output of the electromotive force of the sinusoidal wave illustrated in FIG. 6 is generated from the A phase coil and B phase coil. Since the established phase of the coil is misaligned, the phase of the electromotive force waveform generated in the A phase and the phase generated in the B phase coil are also misaligned. Further, Fleming's left hand rule is applied to the A phase coil and B phase coil.

Figure 7:
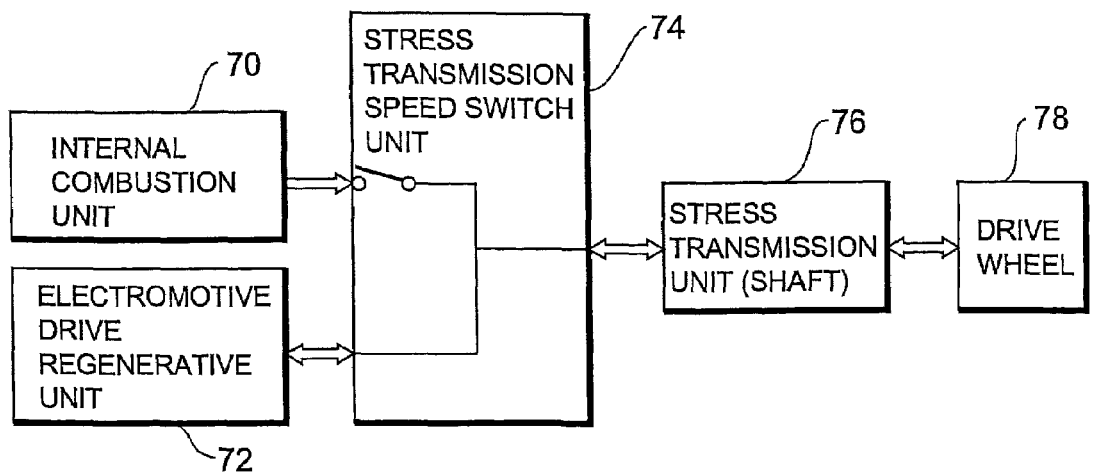
FIG. 7 is a block diagram of the stress transmission from the electric motor to the drive wheel of the drive regenerative control system according to the present invention.

FIG. 7 is a block diagram for explaining the stress transmission to the drivee employing the drive regenerative control system according to the present invention. Reference numeral 70 is an internal combustion, and reference numeral 72 is a drive regenerative control unit. The overall system illustrated in FIG. 7 constitutes a hybrid drive system combining these two power drive sources. The switching unit 74 of this system for switching the stress transmission unit 76 and power drive source is constantly connects the stress transmission unit 76 and drive regenerative control unit for driving or regeneration on the one hand, and is coupled with or disconnected from the internal combustion unit 70. The stress transmission unit 76, for example, is a drive shaft in relation to the drive wheel 78 (load).

Figure 8:
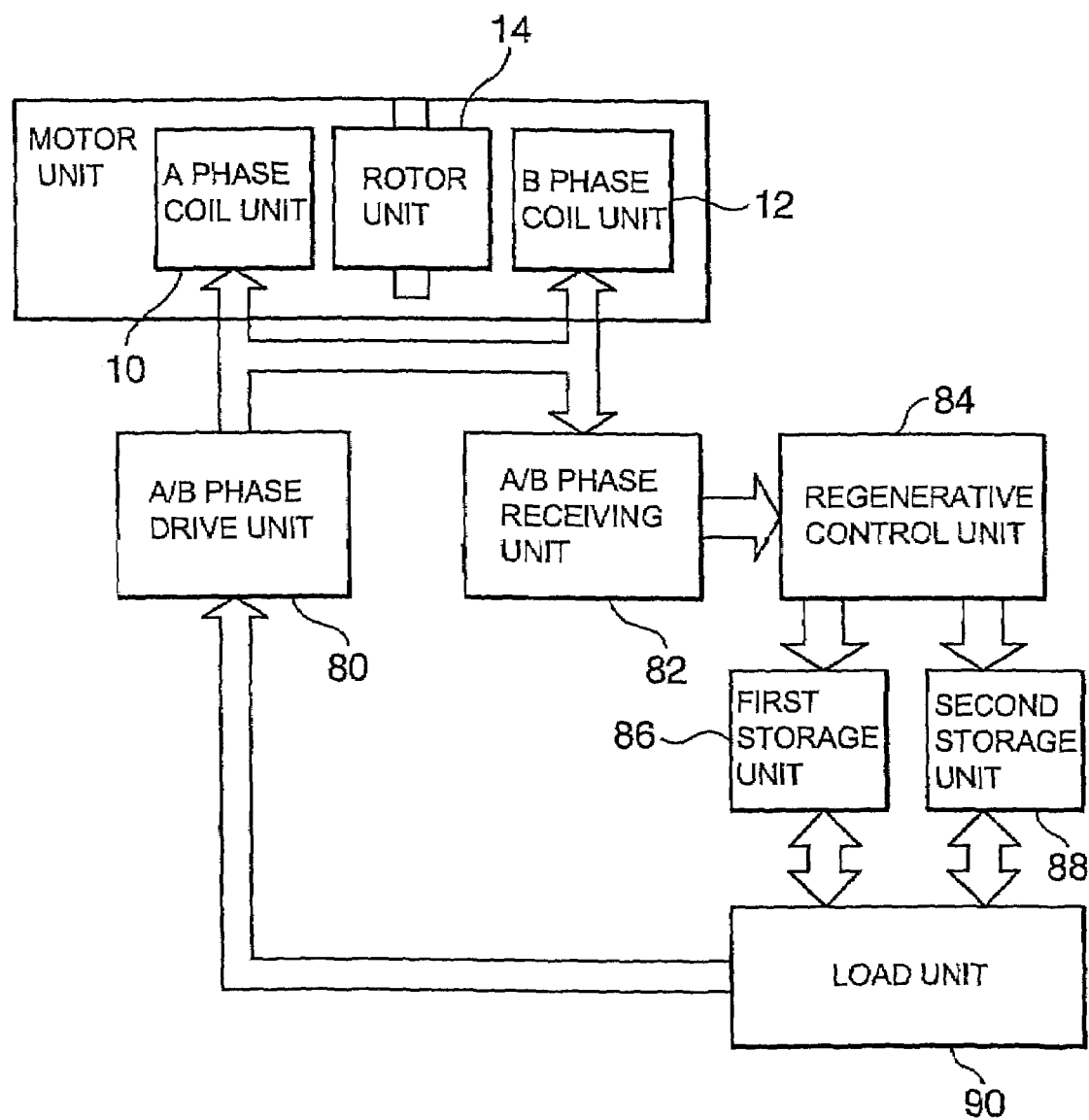
FIG. 8 is a functional block diagram of the drive/regenerative control.

FIG. 8 is a block diagram of the drive regenerative control unit, and reference numeral 80 is the drive unit for controlling the drive of the respective phase coils, reference numeral 82 is the receiving unit for receiving the regenerative current thereof, and reference numeral 84 is the regenerative control unit for controlling the regeneration of the motor. This regenerative control unit stores the obtained regenerative electrical energy in a plurality of storage units 86, 88. Reference numeral 90 is the load unit, and the detection signal of the load is supplied to the respective phase drive units 80. The storage unit to be charged is prioritized from the storage unit with the least storage quantity.

Figure 9:
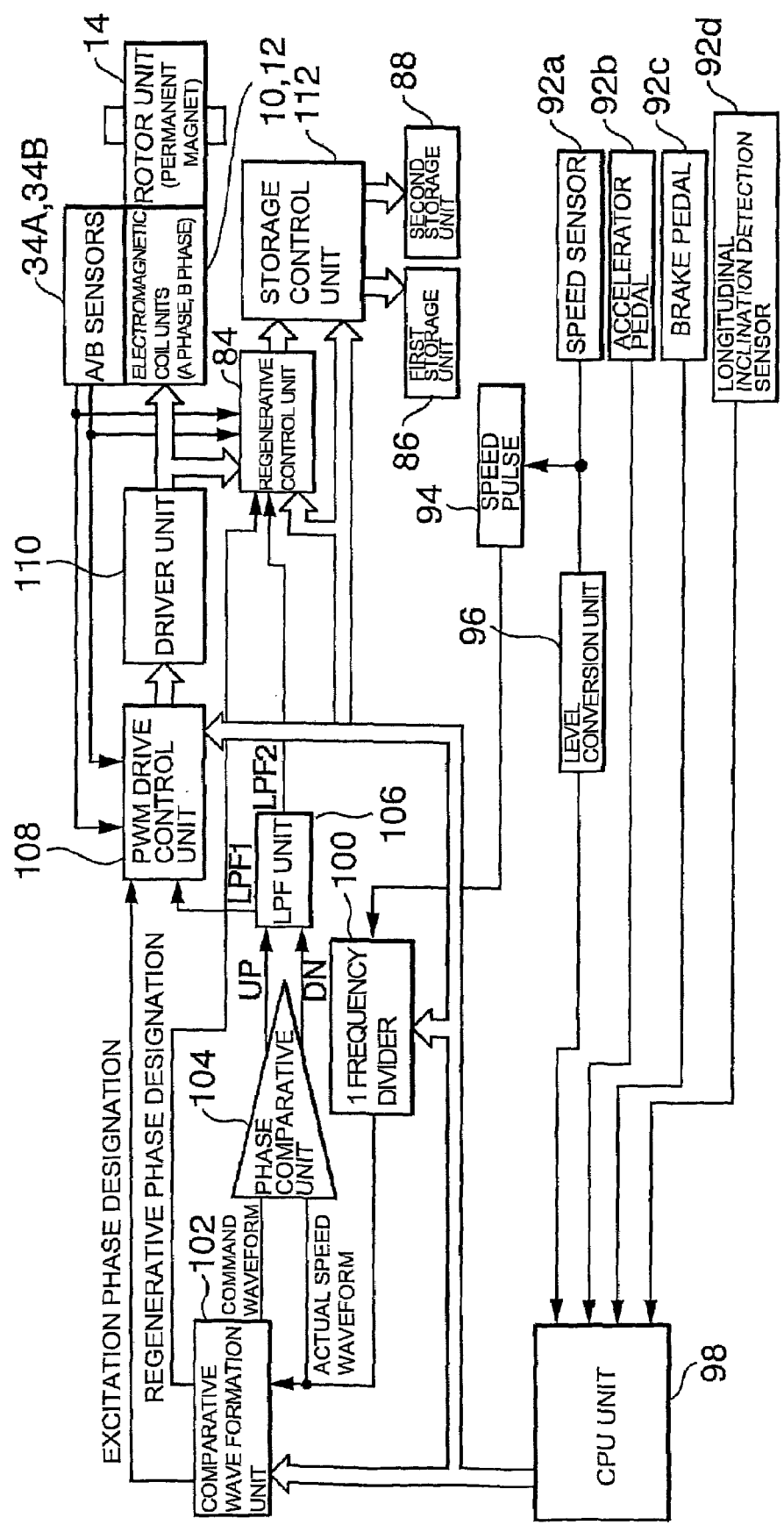
FIG. 9 is a system block diagram of the drive and regenerative control.

FIG. 9 is a diagram showing a more detailed block constitution of the drive regenerative control unit. Output of the respective sensors 92a to 92d is supplied to the CPU unit 98. Output of the speed sensor 92a is converted into a speed pulse 94, and, after being M-divided with the frequency divider 100, the actual speed waveform is supplied to the phase comparator 104 constituting the PLL circuit. The M-division ratio is determined by being subject to the control of the CPU. This actual speed waveform is also supplied to the comparison waveform formation unit 102. This comparison waveform formation unit 102 forms the reference waveform (command waveform) to be phase-compared with the actual speed waveform with the phase comparison unit 104 from the CPU control and actual speed.

When accelerating the motor (UP), the phase of the command waveform is changed upon being subject to the actual speed or CPU control so that a phase difference will be generated between the actual speed waveform. This is also described in the gazette of WO 02/087066. Incidentally, when controlling the motor in the deceleration direction, DOWN (DN) is output from the phase comparison unit 104. Reference numeral 106 is a low pass filter constituting the PLL circuit. Further, reference numeral 96 is the level converter (amplifier).

The comparison waveform formation unit 102 determines whether to use the A phase coil or B phase coil of the motor, and supplies this to the PWM drive control unit 108. When accelerating the motor even further, the coil of both phases is excited, and, if this is not the case, only one of the phases needs to be excited. When subjecting the motor to regenerative control, the phase to be regenerated is similarly determined, and this is supplied to the regenerative control unit 84. The drive control signal LPF1 of the motor output from the low pass filter 106 is supplied to the PWM drive control unit, and the duty of the drive signal is subject to PWM modulation. As a result of this PWM modulation, the drive torque of the motor can be adjusted continuously or gradually. The drive signal subject to PWM modulation is supplied to the driver (excitation circuit of the coil) 110, and excites the electromagnetic coil unit.

The control signal LPF2 of the regenerative circuit output from the low pass filter 106 is supplied to the regenerative control circuit 84. LPF1 is formed based on the acceleration signal (UP) of the motor from the phase comparison unit 104, and LPF2 is formed based on the deceleration signal (DN) of the motor from the phase comparison unit 104. The regenerative control unit 84 controls the storage control unit 112; that is, controls the storage voltage upon storage, and supplies the regenerative electricity energy to one of the storage units. Incidentally, the signal from sensors 34A, B is supplied to the PWM drive control unit 108, and, after the signal from this sensor being subject to PWM modulation, this may also be supplied to the driver unit 110 as a direct excitation signal. Further, the sensor output may also be directly supplied to the regenerative control unit so as to make the sensor output the regenerative electricity energy.

Figure 10:
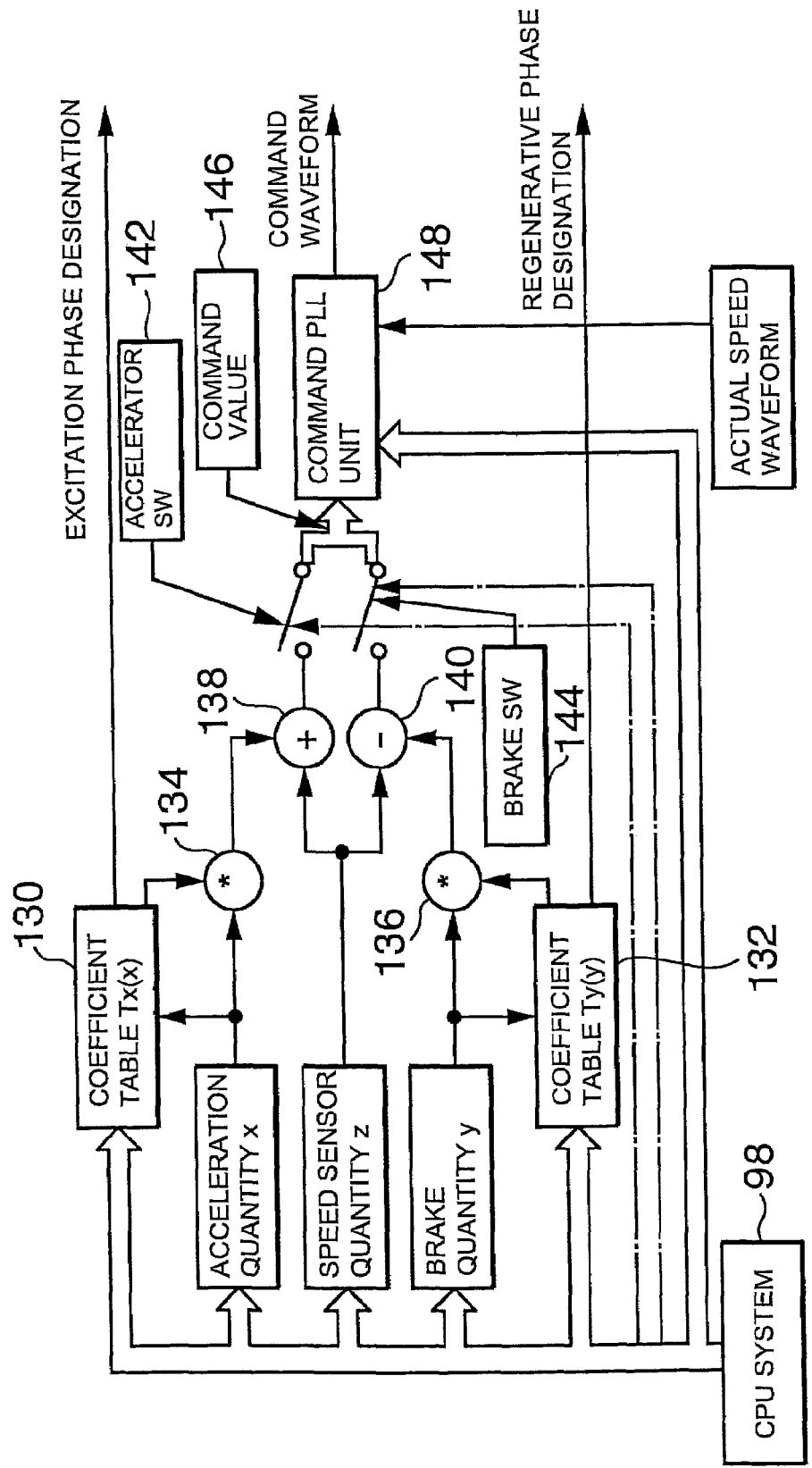
FIG. 10 is a control block diagram of the comparative wave formation unit of the block diagram illustrated in FIG. 9.

FIG. 10 is a diagram showing the comparison waveform formation unit 102, and this system has two coefficient tables 130, 132 in a prescribed area of the memory. The excitation phase or regenerative phase is determined with the respective conversion tables. A prescribed coefficient from the conversion table is multiplied to the acceleration quantity (134), and this is added to the speed sensor quantity (138). This speed acceleration command is supplied to the command PLL unit 148 as the command value 146 via the acceleration switch 142. The command PLL unit 148 forms the command waveform. A prescribed coefficient of the conversion table 132 is multiplied to the brake quantity (136), and this computed value is subtracted from the speed sensor quantity (140). This speed deceleration command is supplied to the command PLL unit 148 as the command value 146 via the brake switch 144. The CPU system 98 controls the ON/OFF of the acceleration switch 142 or brake switch 144. The actual speed waveform is supplied to the command PLL unit, and the command PLL unit 148 forms the command waveform by dividing the actual speed waveform based on the command value 146. This command waveform, as shown in FIG. 9, is supplied to the phase comparison unit 104. In other words, the phase difference is made to move toward the direction of acceleration between the actual speed waveform and command waveform at the phase comparison unit 104 as the acceleration operation speed increases, and, on the other hand, the phase difference is made to move toward the direction of deceleration as the brake operation speed increases.

Figure 11:
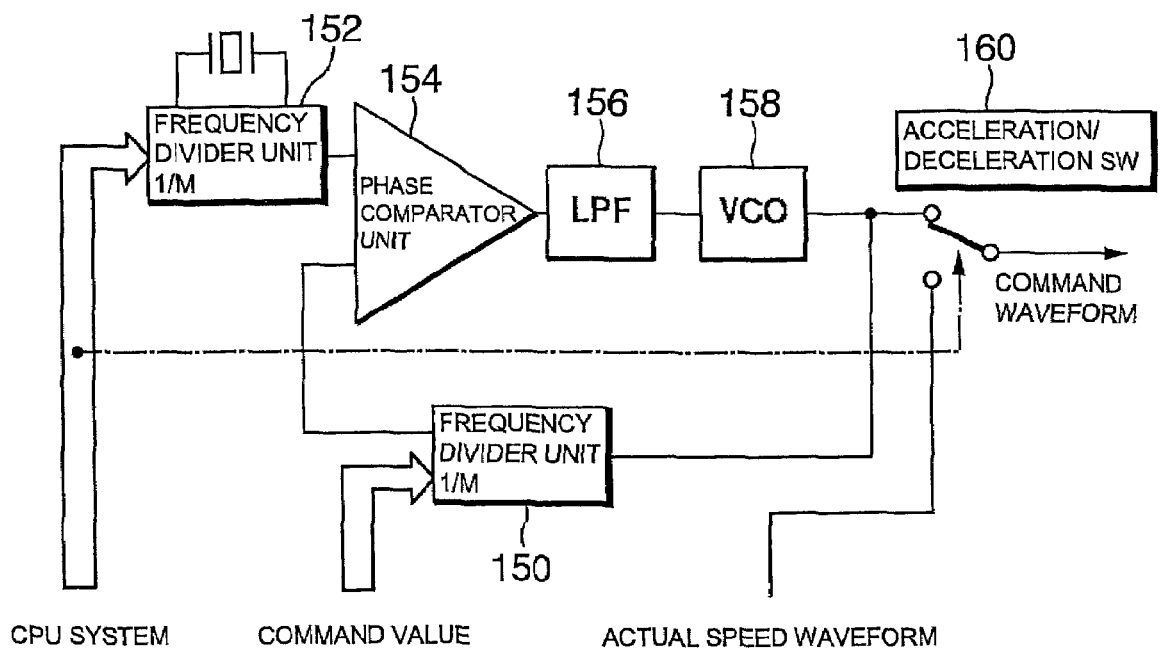
FIG. 11 is a control block diagram of the command PLL unit depicted in FIG. 10.

FIG. 11 is a block diagram of the command PLL unit. The command value depicted in FIG. 10 is supplied to the M frequency divider 150, and the division ration is determined according to the command value. Frequency of the output of the VCO 158 is multiplied M times and supplied to the phase comparator 154. The reference signal from the quartz oscillator is M-divided with the frequency divider 152 subject to the control of the CPU, and supplied as a reference signal to the phase comparator 154. The phase comparator compares the phase difference of the reference signal and comparison signal, and the compared output is output as the command waveform via the low pass filter 156, VCO, and acceleration switch 160. When it is not necessary to drive the motor, the switch is switched to the actual speed waveform side. Here, as shown in FIG. 9, since the phase comparator 104 is supplied with the same actual speed waveform signal, the motor is not driven or regenerated.

Figure 12:
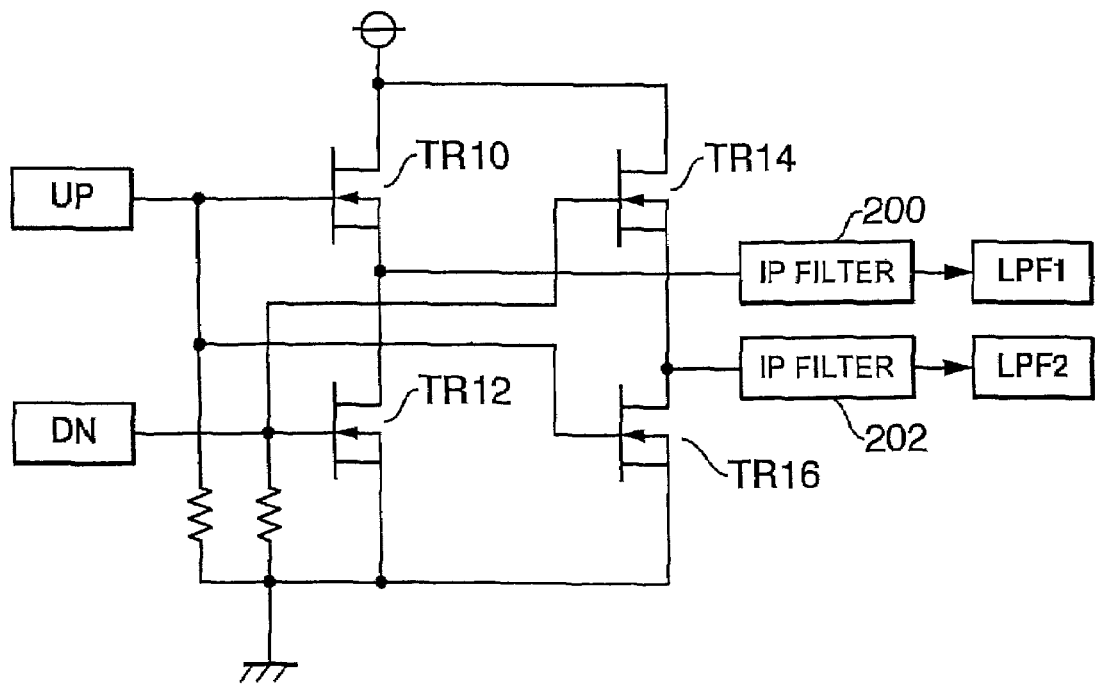
FIG. 12 is a control block diagram of the low pass filter illustrated in FIG. 9.

FIG. 12 is a block diagram of the LPF unit illustrated in FIG. 9, and, when the frequency waveform "H" of UP and the frequency waveform "L" of DOWN are applied, TR10 and TR16 will both be turned on, TR14 and TR12 will be turned off, the low pass filter 200 is connected to the power source, and the low pass filter 202 is grounded so as to output LPF1. Meanwhile, when UP="L" and DOWN="H" are applied, TR10 and TR16 will both be turned off, TR14 and TR12 will be turned on, the low pass filter 202 is connected to the power source, and the low pass filter 200 is grounded so as to output LPF2. As a result, the frequency rectangular wave of the UP signal is made analogue, or the frequency rectangular wave of the DN signal is made analogue.

Figure 13:
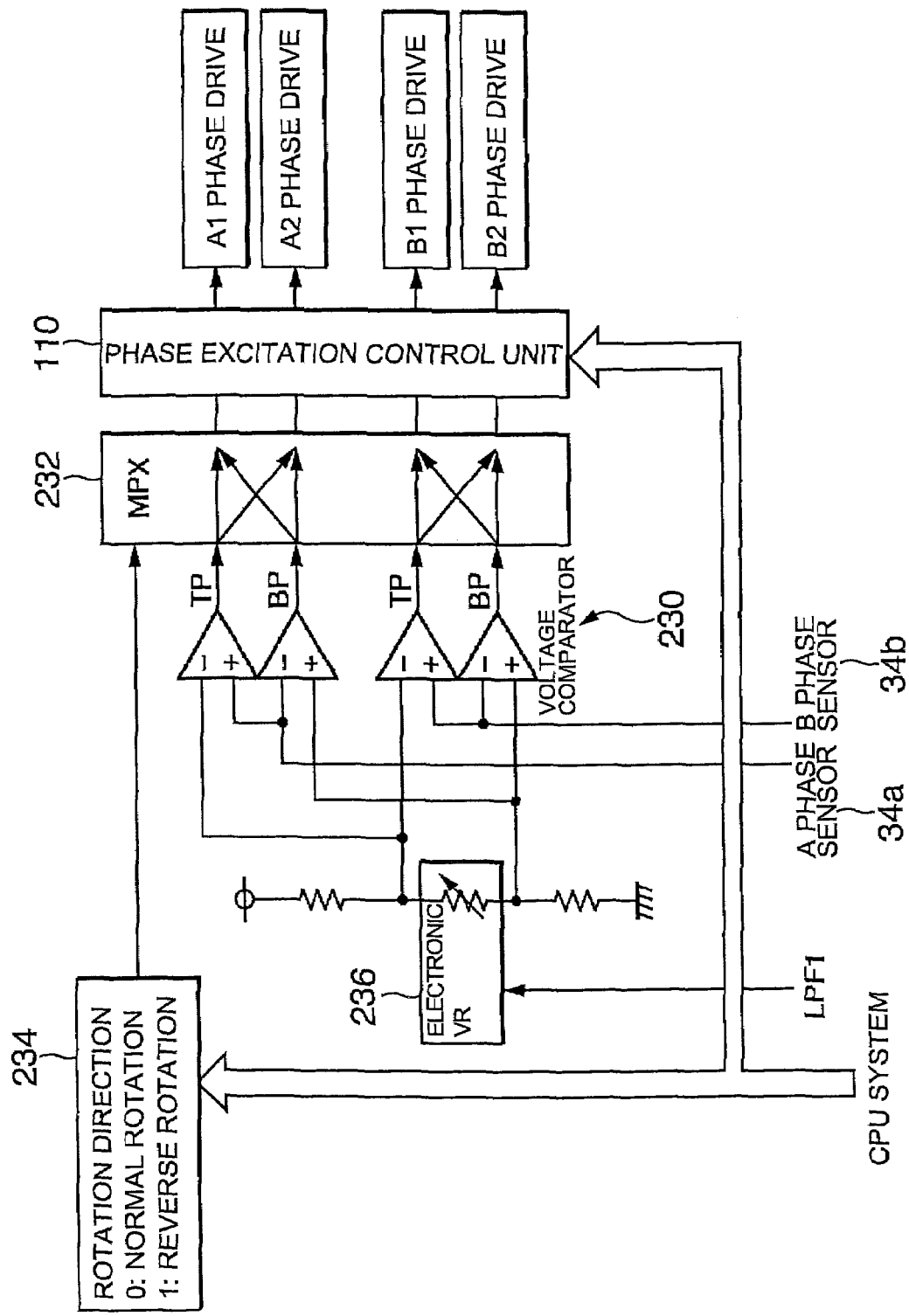
FIG. 13 is a block diagram of the PWM drive control unit depicted in FIG. 9.

FIG. 13 is a diagram showing the digital drive circuit based on an analog sensor, and reference numeral 230 is a voltage comparator employing a circuit constitution pertaining to the reverse signal obtained from the window comparator as an example of the hysteresis level setting means (hereinafter referred to as the "window comparator"), and the hysteresis level is determined by the output of the A phase sensor 35A and the output of the B phase sensor 35B being input and compared with the input value of the variable resistance control circuit 136. Reference numeral 232 is a switch circuit for switching whether to control A coil with the A1 phase drive waveform or the A2 phase drive waveform, and the same applies to the B phase coil.

The variable resistance control circuit 236 determines the resistance value based on the input value of LPF1, and the hysteresis level is set thereby. In other words, by making the hysteresis level variable, the motor characteristics can be torque controlled. For example, upon starting the motor, the hysteresis level is set to minimum, and the motor is driven giving preference to the torque and sacrificing the efficiency. This is explained later with reference to FIG. 14. Further, when the motor is in a state of operational stability, the hysteresis level is set to maximum to drive the motor giving preference to high efficiency. The control circuit 234 selects a mode among a mode of exciting the A phase coil and B phase coil and rotating the rotor, a mode of exciting one phase and rotating the rotor, and a mode of changing the polarity of the excitation current to either phase and reversing the motor. Output of the control circuit 234 is supplied to the MPX, output of the window comparator 230 is switched based on the control command of the control circuit 234, and supplied to the phase excitation control unit 110A. The output of the phase excitation control unit 110A drives the A phase coil and B phase coil in two phases, respectively.

Figure 14:
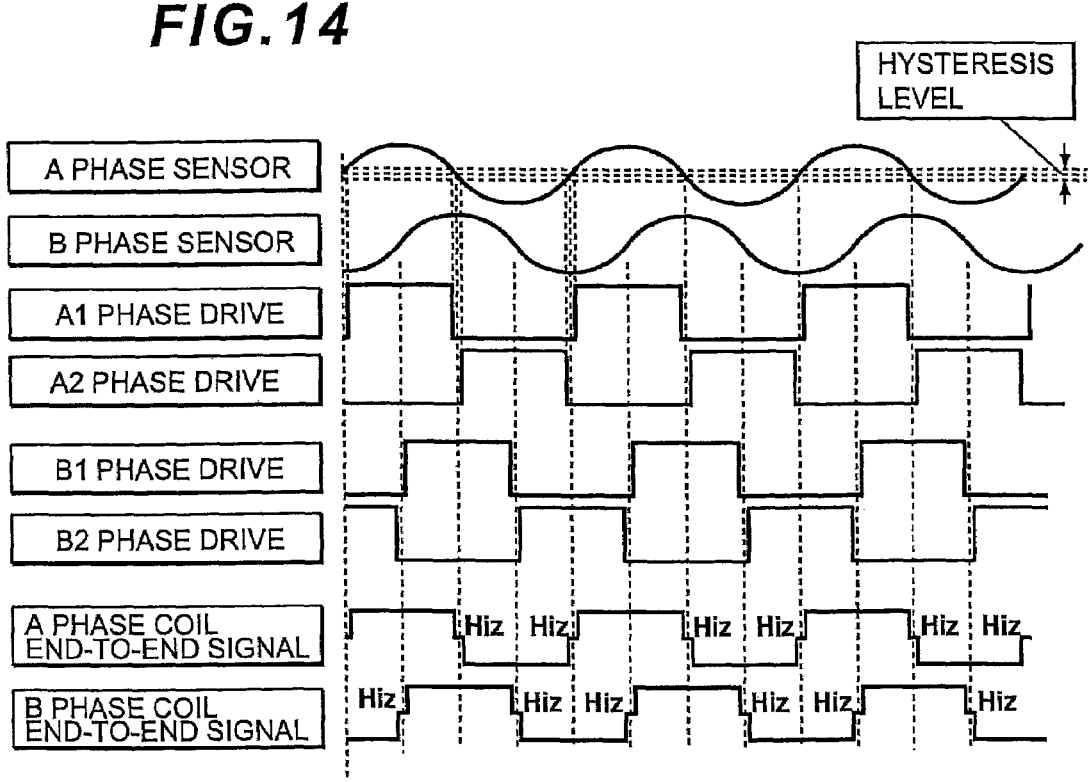
FIG. 14 is a timing chart of a signal in a high drive torque state when the LPF1 signal is large.

FIG. 14 is control waveform diagram in a case of attempting to rotate the rotor in a stopped state, for instance, at a high torque, and, when the hysteresis level is set to minimum, the window comparator 230 compares the sensor output value and hysteresis level, the output value of the sensor is converted into a logic quantity, an excitation signal of a high duty ratio is switched and supplied to from the multiplexer 232 to the A phase coil array and B phase coil array, and the motor attempts to rotate at a high torque. When the LPF1 signal becomes large, the resistance value of the hysteresis adjustment electronic VR becomes small, the drive torque becomes great, and the power consumption becomes great.

Figure 15:
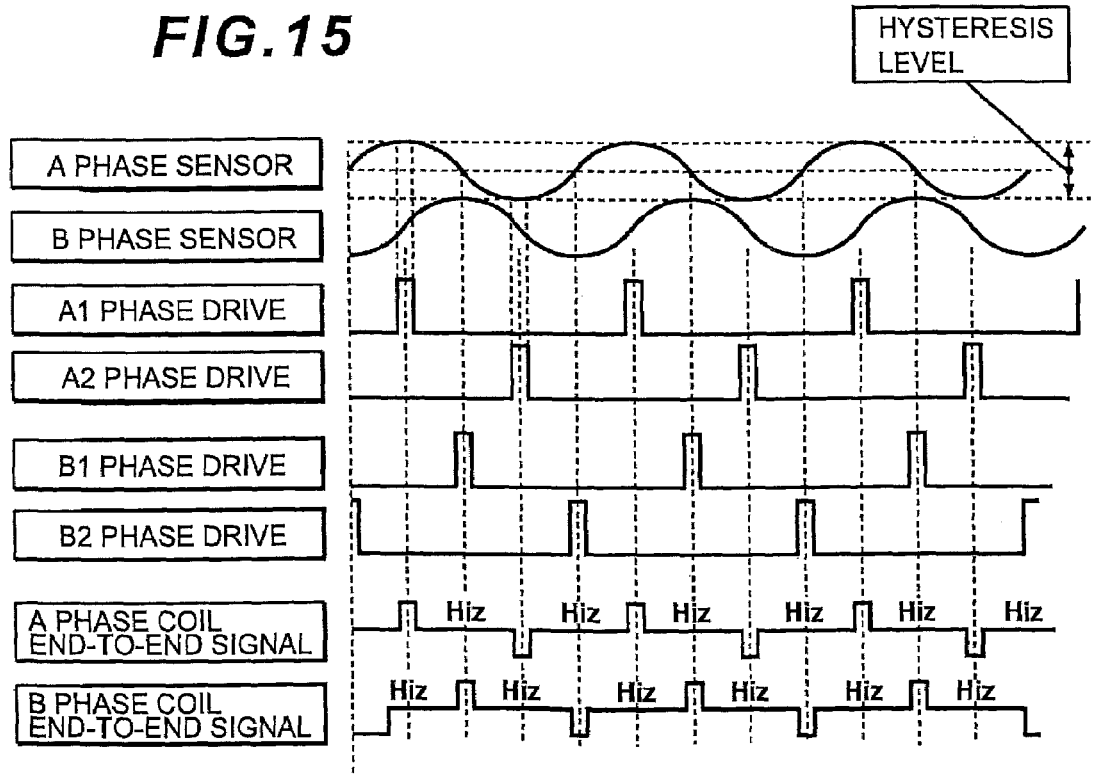
FIG. 15 is a timing charge of a signal in a low drive torque state when the LPF1 signal is small.

As shown in FIG. 15, when the hysteresis level is set to maximum in a state where the rotor is rotating stably, an excitation signal of a low duty ratio is applied to the respective phase coil arrays, and the drive torque of the motor will decrease. Nevertheless, the motor can be operated at a high efficiency. In FIG. 14, although the torque will become maximum, the power consumption will also become maximum. In the case of FIG. 15, although the torque will become minimum, the power consumption will also become minimum. As a result of continuously or gradually switching the hysteresis level, the motor torque can be adjusted linearly or in multi stages. In other words, when the LPF1 signal becomes small, the resistance value of the hysteresis adjustment electronic VR becomes large, the drive torque becomes small, and the power consumption becomes small.

Figure 16:
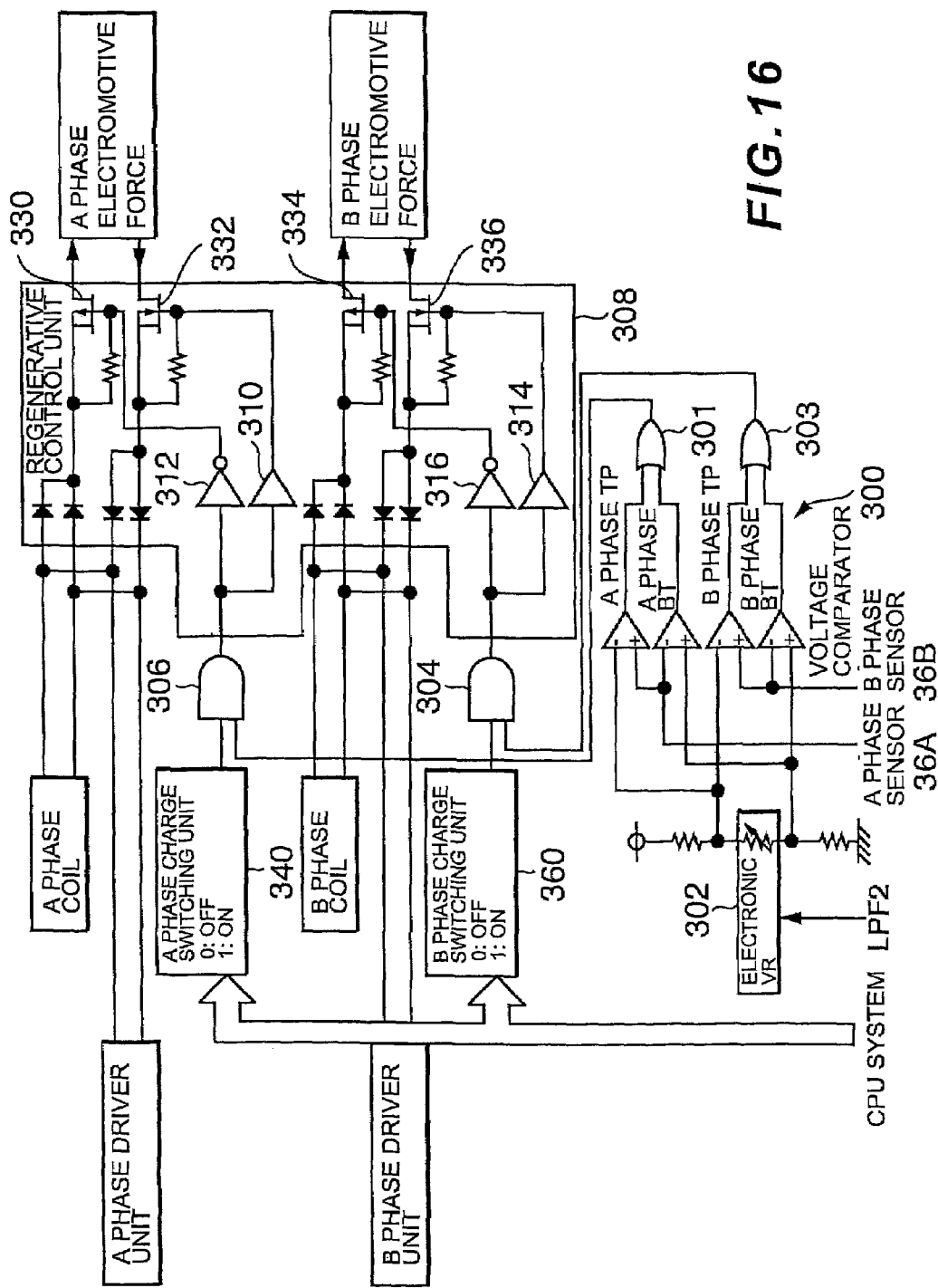
FIG. 16 is a functional block diagram of the regenerative control unit.

FIG. 16 is a block diagram for explaining the regenerative control. Reference numeral 300 is the same window comparator described above, the output of the respective phase sensors and the hysteresis level (302) set forth with the output of LPF2 described above are compared, and the output thereof is supplied to the AND gate 306 or 304 via the OR gate 301 or 303. Output of the AND gate 306 is supplied to the inverters 312 and 310, output of the inverter 312 is inverted and supplied to the transistor 330, and output of the inverter 310 is supplied to the transistor 332. Output of the AND gate 304 is supplied to the inverters 316 and 314, output of the inverter 316 is inverted and supplied to the transistor 334, and output of the inverter 314 is supplied to the transistor 336. Output from the OR gate 301 becomes the regenerative enabling signal to the A phase coil, and, when the A phase charge command "1" is supplied from the CPU to the AND gate 306, "H" is output from the gate 306 when the enabling signal is at the "H" level, and the transistor 330 is turned on thereby. Then, the reverse electromotive force generated in the A phase coil can be supplied to the charging means as the A phase electromotive force. Meanwhile, when the charging command signal from the CPU system is "0"=non-resurrection, or, when the regenerative enabling signal is "L", the transistor 332 is turned on, and the drive output "H" is supplied to the A phase driver unit. The CPU judges whether the driver is being driven or subject to braking (regeneration), and outputs to the A phase charge switching unit 340 regenerative enabling "1" or non-regeneration "0". This is the same for the B phase coil. Reference numeral 360 is the B phase charge switching unit.

Figure 17:
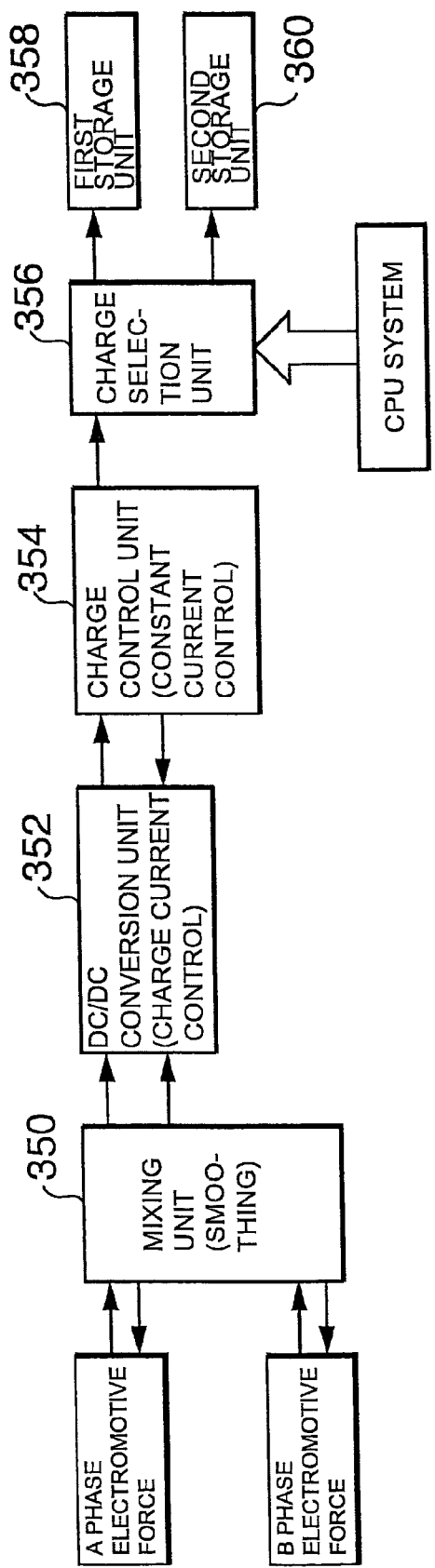
FIG. 17 is a functional block diagram of the storage control unit.

FIG. 17 is a block diagram of the charge (storage) control unit, and the electromotive force of the A phase coil and the electromotive force of the B phase coil are supplied to the smoothing circuit 350, and subsequently supplied to the charge control unit (constant current control unit) 354 via the DC/DC conversion unit (charging current control unit) 352. Reference numeral 356 is the charge selection unit, and the CPU system selects the storage unit 1 (358) or storage unit 2 (360) to perform storage.

Figure 18:
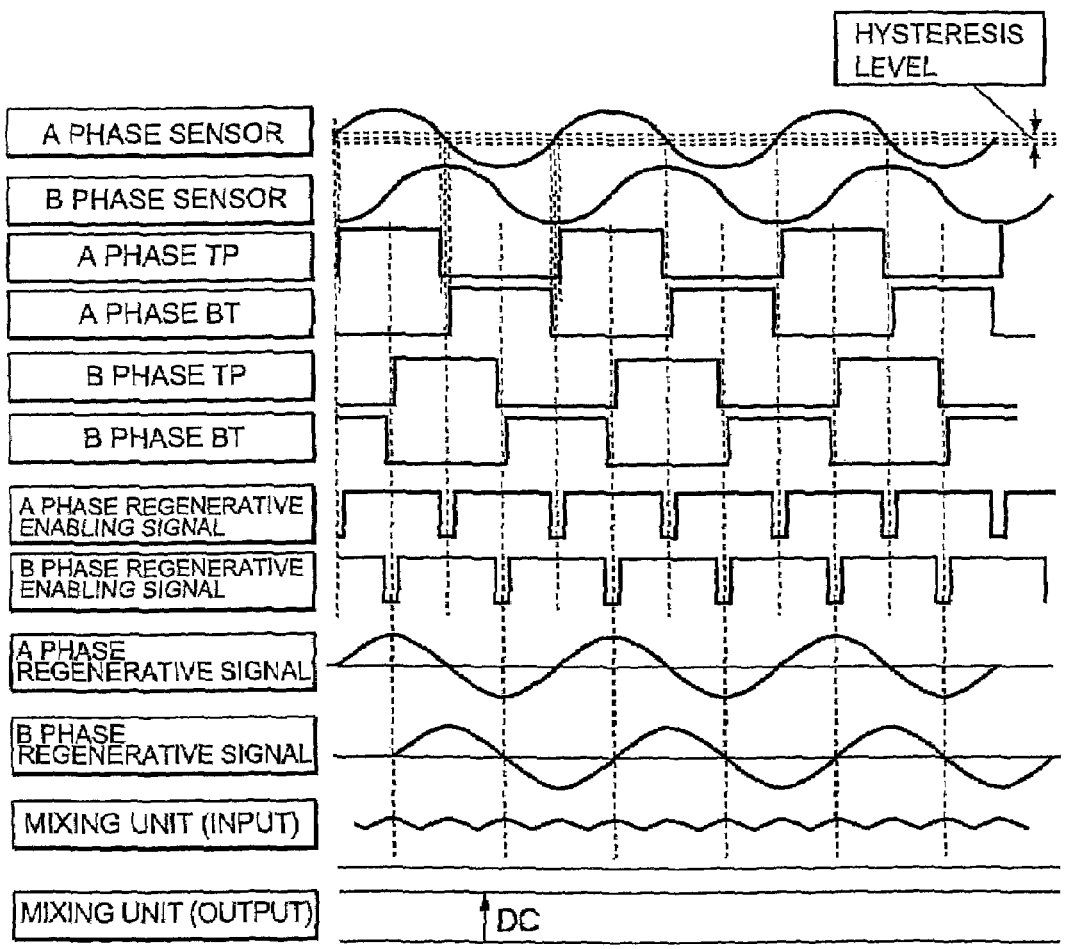
FIG. 18 is a regenerative control timing charge based on the LPF2 signal.
Figure 19:
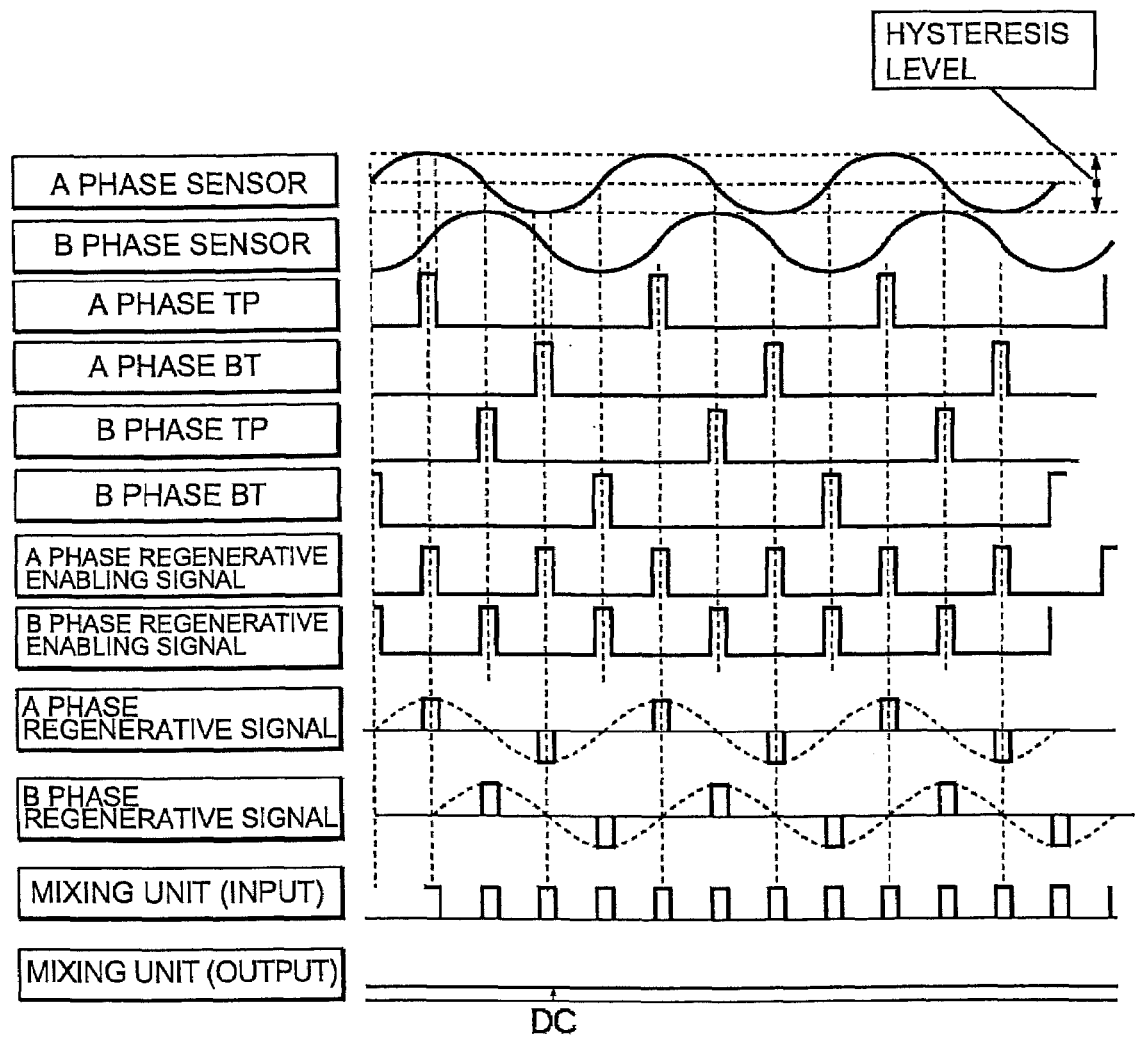
FIG. 19 is a modified example of this timing chart.

FIG. 18 is a waveform diagram showing a case when the hysteresis adjustment electronic VR is small and the regenerative energy is maximum, and FIG. 19 is a waveform diagram showing a case when the hysteresis adjustment electronic VR is maximum and the regenerative energy is minimum. In the case of a high load (strong regenerative braking state), the duty ratio of the regenerative enabling signal of the respective phases will become high, and, when the regenerative enabling signal is in the period of "H", the regenerative current from the respective coils of the A phase and B phase is supplied to the load (battery). This is the state illustrated in FIG. 18. The regenerative signal of the A phase coil and the regenerative signal of the B phase coil are mixed and become the input value to the storage control unit 112 of FIG. 9, and this is supplied to the storage unit as the smoothed direct current. In other words, when the LPF2 signal becomes large, the resistance value of the hysteresis adjustment electronic VR becomes small, and the regenerative energy becomes maximum.

Meanwhile, in the case of a low load (weak regenerative braking state), as shown in FIG. 19, the duty ratio of the enabling signal of the respective phases will become small, and when the regenerative enabling signal is in the period of "H", the regenerative current from the respective phase coils is supplied to the load. When the LPF2 signal becomes large, the resistance value of the hysteresis adjustment electronic VR becomes small, and the regenerative energy becomes maximum. On the other hand, when the LPF2 signal becomes small, the resistance value of the hysteresis adjustment electronic VR becomes large, and the regenerative energy becomes minimum.

FIG. 20 is a control system diagram of the CPU unit illustrated with reference numeral 98 in FIG. 9, and a control table relating to the control of the hybrid system constituting the internal combustion and the foregoing electric motor. The status represents the operation status of the automobile as the drivee, AH1 of "drive" represents a case where the motor is being driven at a high torque, and AH2 represents a case where the motor is being driven at a low torque. In the former, excitation current is supplied to the electromagnetic coil of both A and B phases, and in the latter, the excitation current is only supplied to the A phase. In the case of the former, the internal combustion is also started, and strong acceleration force can be achieved. In the case of the latter, the internal combustion is in a stopped state. "Stable" means that the [automobile] is in a running state at a constant speed (low load state) on a level ground, and the A phase coil is placed in the drive control by LPF1, and the B phase coil is placed in the regenerative control by LPF2. Here, the internal combustion is started to support the simultaneous drive and regeneration of the motor.

CH2 of the regenerative status is aimed for the braking during a downhill slope or the like, and for a relatively weak braking force. Only the A phase coil is being used for the braking. CH1 is aimed for a relatively strong braking (other than the foot brake) giving consideration to fully stop the vehicle, and both phase coils are subject to regenerative control. Further, during forced braking, the polarity of the excitation current to be supplied to one of the AB phase coils is reversed so as to rotate the rotor in the reverse direction.

Figure 21:
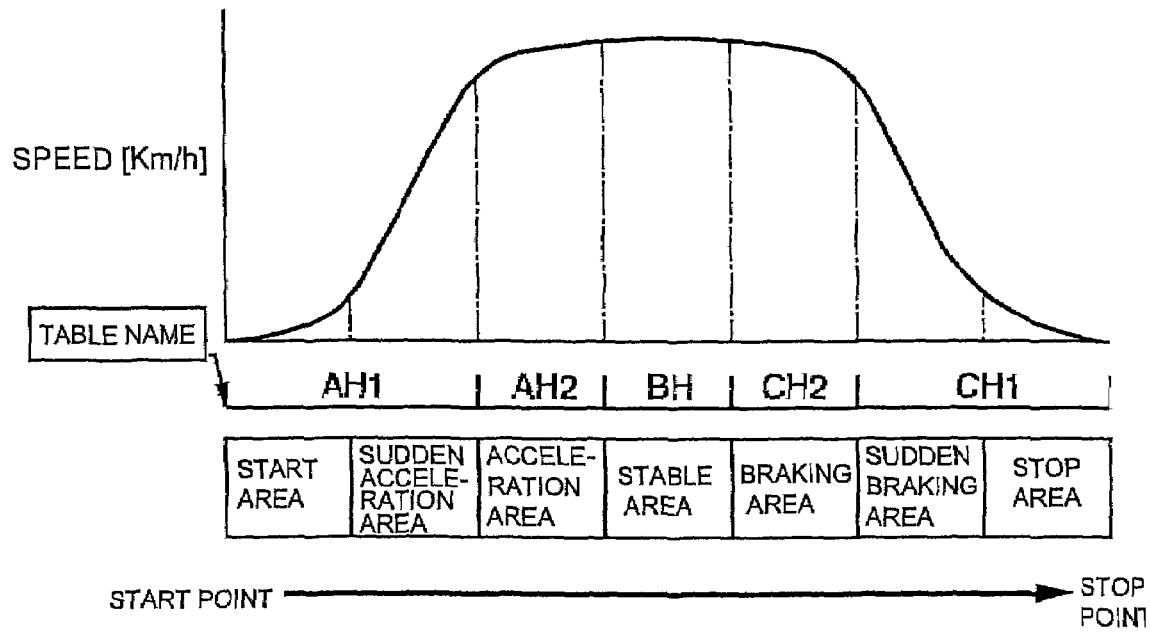
FIG. 21 is a diagram showing a status transition example from the start of the vehicle, through stable running, until the vehicle stops.
Figure 22:
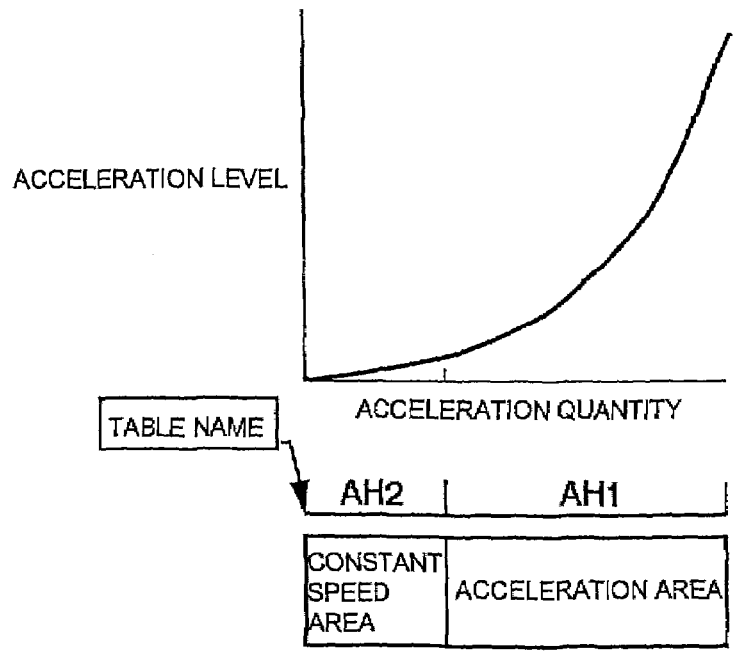
FIG. 22 is a characteristics diagram of the acceleration and acceleration level.
Figure 23:
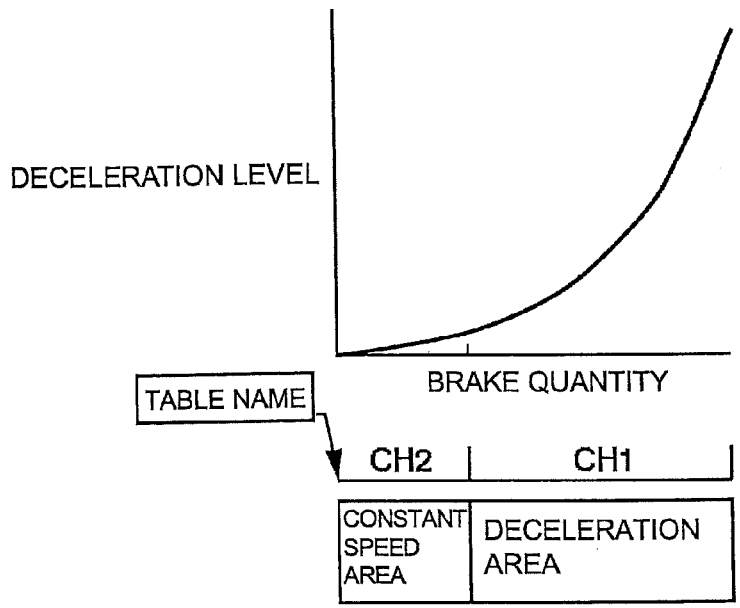
FIG. 23 is a characteristics diagram of the brake and deceleration level.

FIG. 21 shows the used condition of the table depicted in FIG. 20 when considering the series of motions from the vehicle starting from a stopped state, running stably, and then being stopped. The target control mode is selected from the table according to the operation status of the vehicle. FIG. 22 is a relative diagram of the acceleration quantity and acceleration level, and a table is selected where, the larger the acceleration opening, the stronger the driving force to be obtained. FIG. 23 is a relative diagram of the brake quantity and deceleration level, and a table is selected where, the larger the brake operation quantity, the stronger the regenerative quantity.

Figure 24:
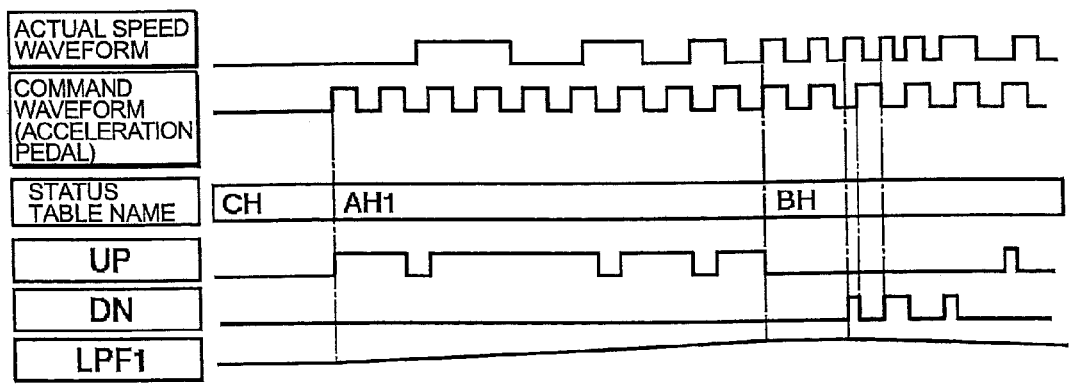
FIG. 24 is a waveform diagram showing the control timing transition of the stop area, start area and stable running area of the vehicle.

FIG. 24 is a timing variation diagram from the vehicle in a stopped state to a stable running state, and the actual speed waveform is the speed pulse waveform counting the output value of the speed sensor illustrated in FIG. 9 with an encoder. The command waveform determines the control status requested to the vehicle from the opening and operational speed of the accelerator pedal; that is, it is the pulse waveform to be supplied from the comparison waveform formation unit 102 to the phase comparison unit 104. The target status table (AH1 or AH2) is selected from the acceleration opening, operation speed thereof and the vehicle speed, and the UP signal for accelerating the motor is supplied to the respective coil phases based on the phase difference thereof. When the vehicle reaches a stable running state, the control status becomes the BH table, and a low frequency UP signal is supplied to the A phase coil, and a DN signal for subjecting the B phase coil to regenerative control is supplied to the B phase coil side. The drive output (pulse wave) to the motor is integrated with the LPF filter 200 of the circuit illustrated in FIG. 12 during the UP period, and this is output as LPF1 (analogue quantity). LPF1 is output to the PWM control unit 108 to create a duty ratio, and the motor is driven based on this duty ratio.

Figure 25:
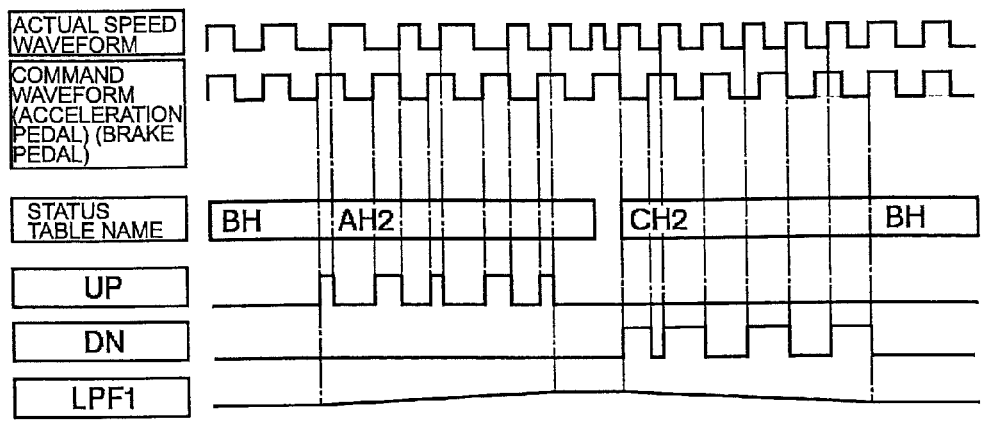
FIG. 25 is a waveform diagram showing the control timing transition of the stable running area of the vehicle.
Figure 26:
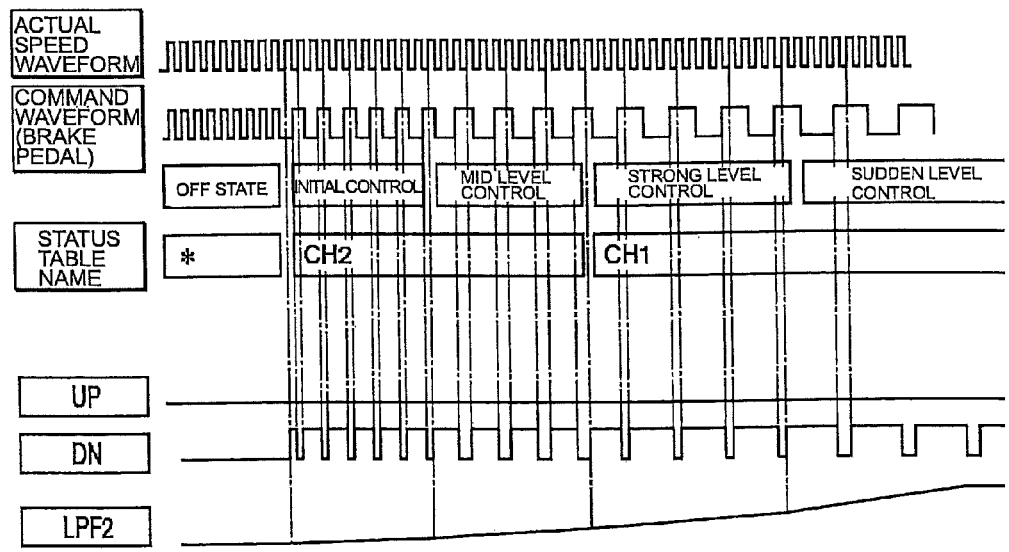
FIG. 26 is a waveform diagram showing the control timing transition from the stable running area of the vehicle, through braking, until reaching a stopped state.

FIG. 25 is a timing variation chart of the stable running area, and the status table to be selected differs from the case shown in FIG. 24. FIG. 26 shows a state where the vehicle is subject to braking while it is running stably, and then stopped, and, since the regenerative control status is selected as the status table, it shows that LPF2 of FIG. 9 is being supplied to the regenerative control circuit. The regenerative control output (pulse wave) to the motor is integrated with the low pass filter 202 of the circuit illustrated in FIG. 12 and output to the regenerative control unit 84 as LPF2 (analogue quantity).

Figure 27:
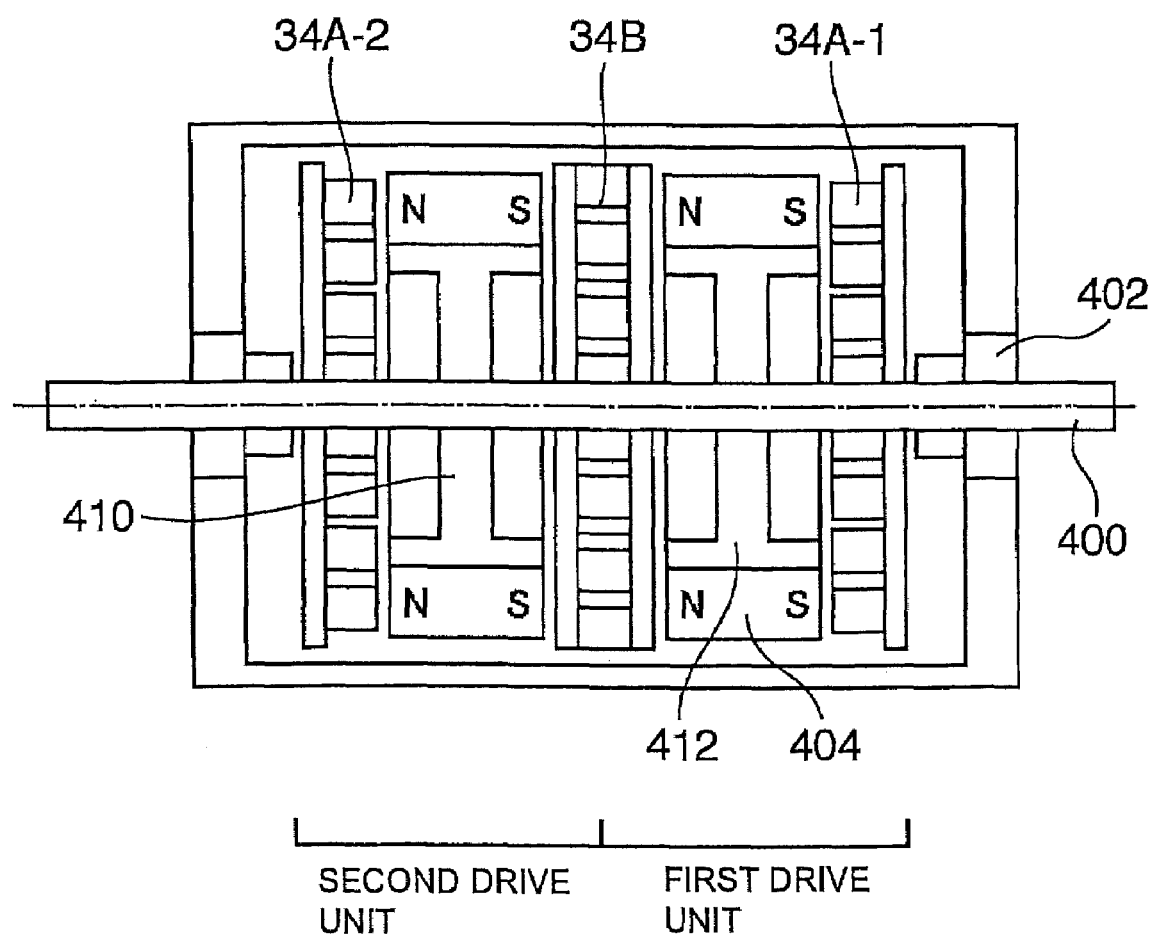
FIG. 27 is a structural diagram of the motor showing a state where a plurality of rotors is provided serially to the electric motor.

FIG. 27 is a diagram showing the configuration of the electric motor in which rotators for rotating the rotational axis are provided serially to the rotational axis 400. One rotator 412 rotates the A1 phase coil and B1 phase coil as the stator. The second rotator 410 rotates the A2 phase coil as the stator with a common B1 phase coil. Since this motor has two (a plurality of) rotators, it is able to double (multistage) the drive torque in comparison to a motor having only a single rotator.

FIG. 28 is a diagram showing the control table to be applied to the motor illustrated in FIG. 27, and first: A phase represents the A1 phase, second: A phase represents the A2 phase.

As evident from this table, the drive torque of the motor can be controlled in multiple stages in relation to the drive/stable control/regenerative control of the electric motor, respectively.

Figure 29:
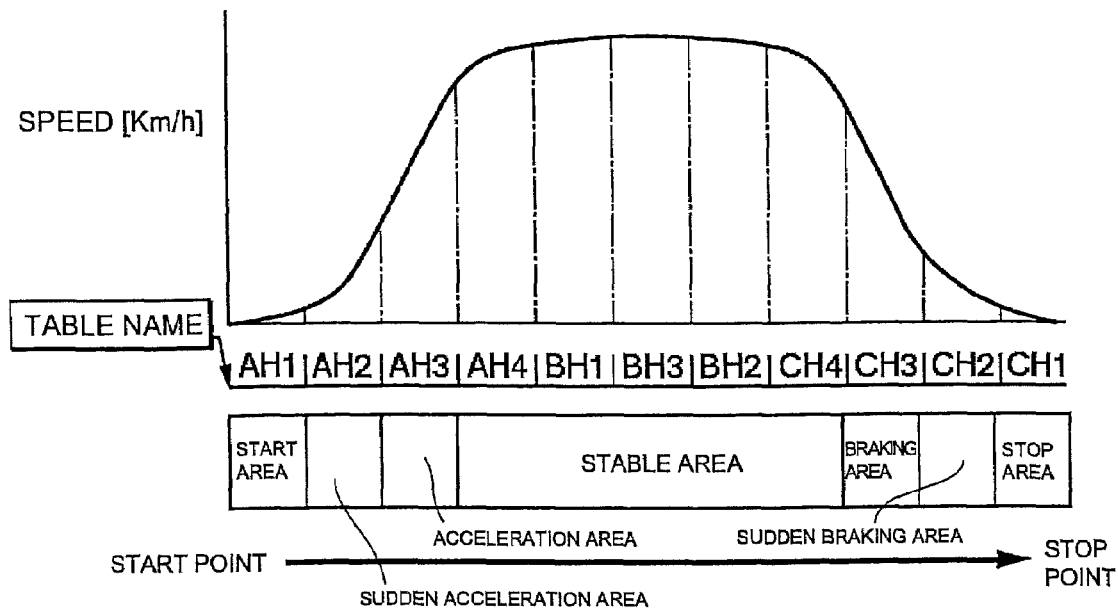
FIG. 29 is a control characteristics diagram of the electric motor from the start of the vehicle, stable running until the vehicle stops based on the control table.

FIG. 29 is a relative curve of the control status to be selected from the control table and the vehicle speed from the start of the vehicle, to the stable running thereof, until the vehicle stops. The CPU system selects the corresponding control status from the control table based on the vehicle speed, acceleration operation quantity and brake operation quantity, and outputs the drive command or regenerative control command to the electromagnetic coil phase to be selected in such control status.

Figure 30:
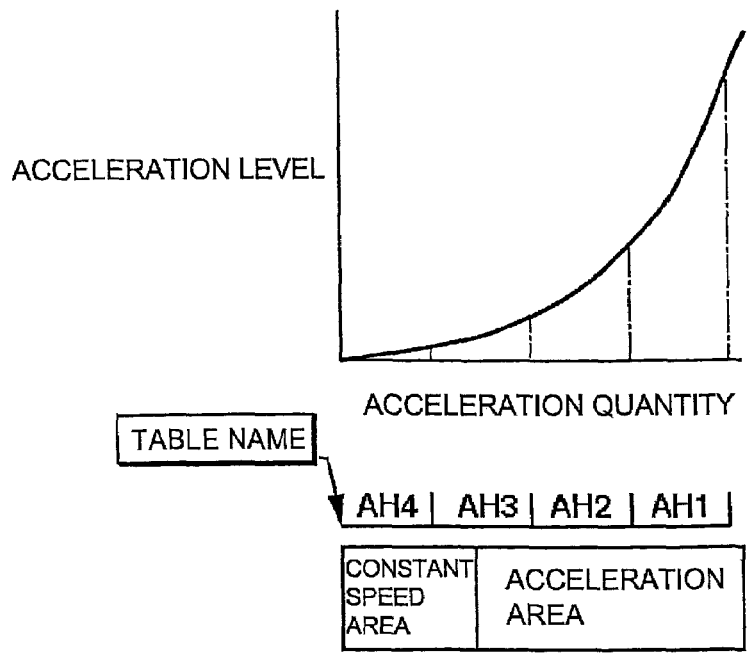
FIG. 30 is a control characteristics diagram of the accelerator and acceleration level to be applied to the motor.
Figure 31:
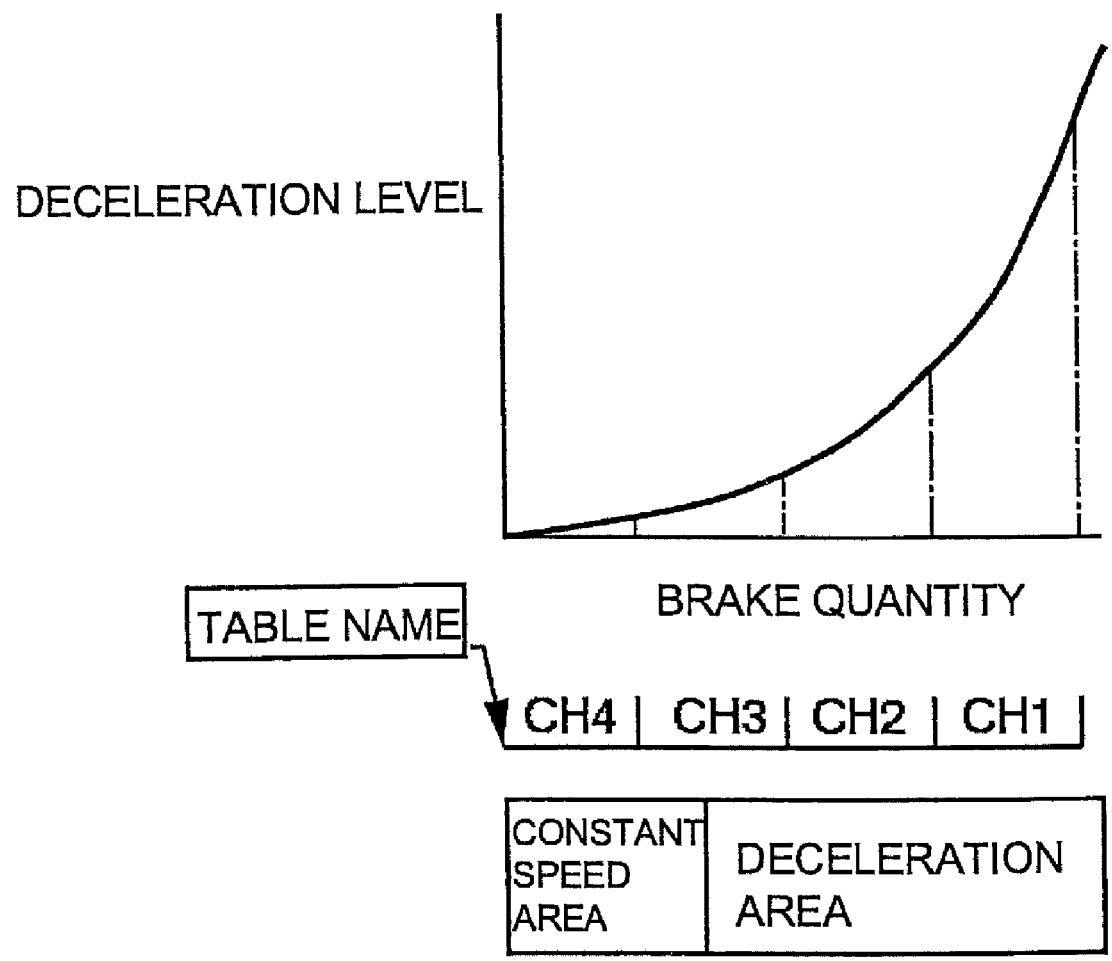
FIG. 31 is a control characteristics diagram of the brake and deceleration level to be applied to the motor.
Figure 32:
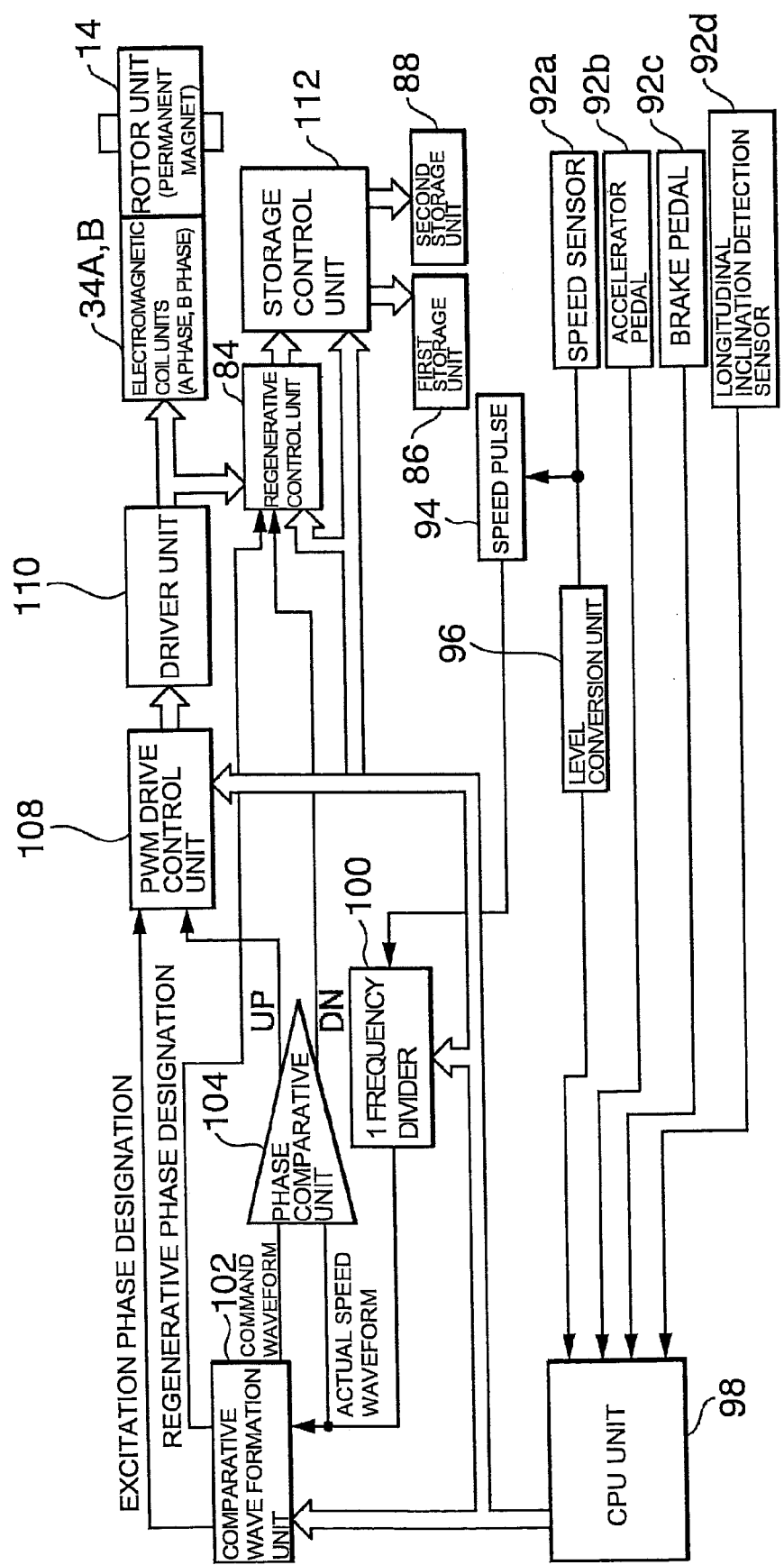
FIG. 32 is a modified example of the system illustrated in FIG. 9.
Figure 33:
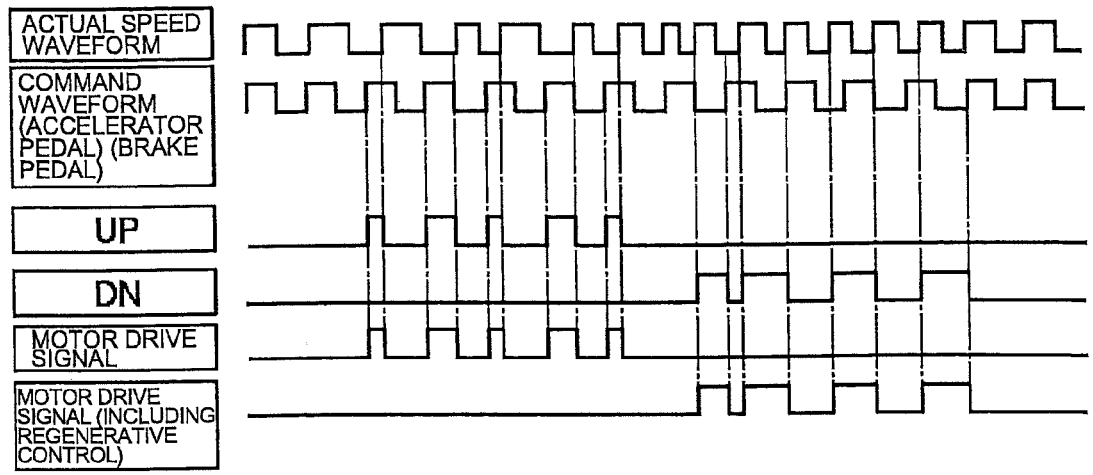
FIG. 33 is a control timing chart of the system depicted in FIG. 32.

FIG. 30 is a relative curve of the acceleration operation quantity and acceleration level, and the control status to be selected will differ according to the acceleration operation quantity. FIG. 31 is a relative curve of the brake operation quantity and the deceleration level. FIG. 32 is a modified example of the system illustrated in FIG. 9, and FIG. 33 is a timing charge of the system depicted in FIG. 32. The system of FIG. 32 differs from the system of FIG. 9 with respect to the point that the phase comparison result in the phase comparison unit 104 is directly supplied to the PWM drive control unit 110 or regenerative control unit 84. As shown in FIG. 33, the PWM drive control unit 108 outputs the waveform of the motor drive command value UP as the motor drive signal without change to the drive circuit of the motor. Further, the regenerative control command DOWN of the motor is output to the regenerative control unit without change.

Figure 34:
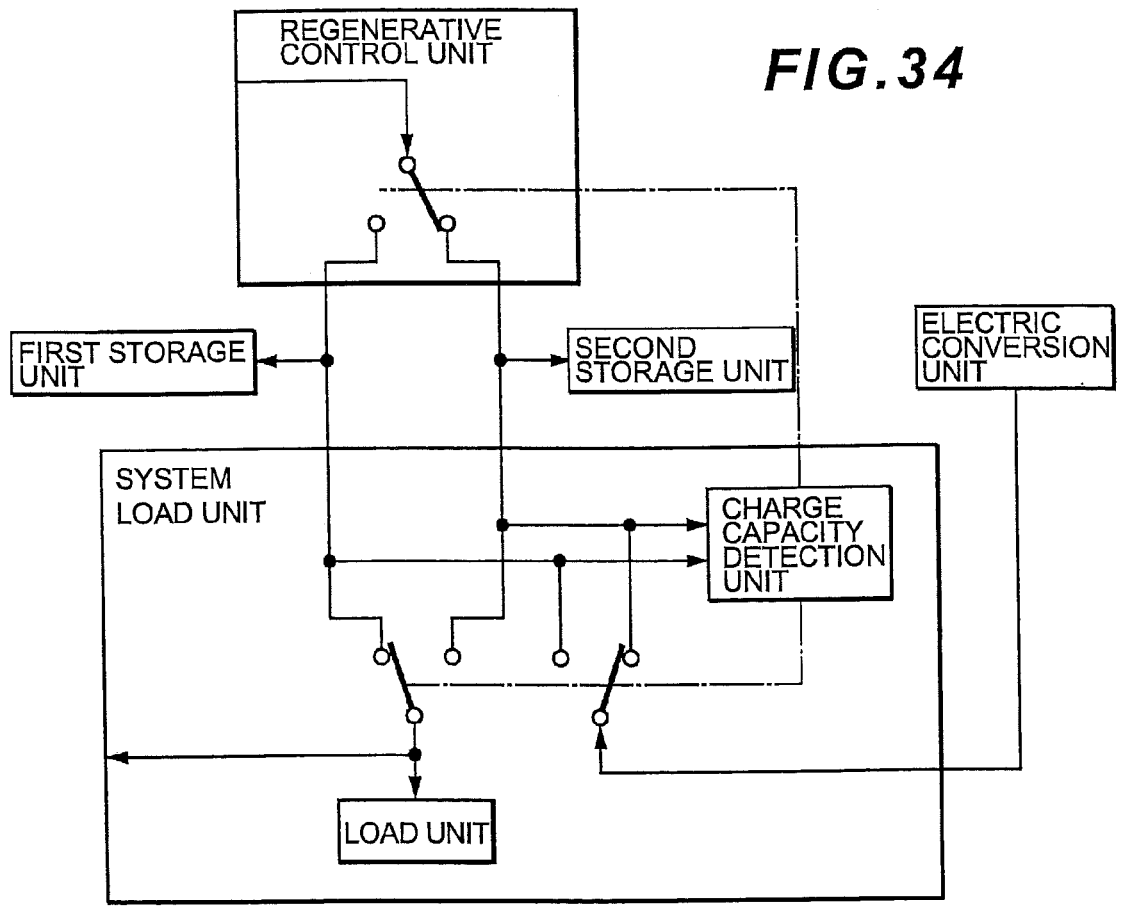
FIG. 34 is a block diagram of the storage control system.

FIG. 34 is a block diagram for explaining the storage control, and the regenerative control unit switches the charging to the plurality of first storage units and second storage units. The regenerative control unit or storage control unit checks the storage quantity of the respective storage units, and preferentially charges the regenerative current to the storage unit with the largest storage quantity. Incidentally, in FIG. 34, the load unit is, for example, the electrical components of the vehicle, and the electricity conversion unit is, for instance, the power generation system based on internal combustion such as an alternator.

In the foregoing embodiments, although the phase coils of the electric motor were formed from the two phase coils of A phase and B phase, this may also be formed from a motor having a plurality of phase coils. Incidentally, with the drive control system of the present invention, when the vehicle is in a low load running state (low load operation state), since a plurality of phase coils of a single electric motor is used for both driving and regeneration, there is an advance in that the electric motor system can be simplified without having to separate a driving motor and regenerative motor, and the weight of the vehicle can be lightened.

What is claimed is:

1. An electric motor operation control circuit that controls the drive and regeneration of an electric motor that drives a driven body, comprising:
    a comparison circuit that compares the phase of a detection signal, which is obtained based on the output of sensor which detects motion of the driven body, and the phase of a reference signal, and forms a drive control signal and a regeneration control signal based on the phase difference;
    a PWM drive control part that forms a drive signal for which a duty ratio is set based on the drive control signal, and supplies the formed drive signal to a drive circuit of the electric motor;
    a regenerative control part that forms a regenerative permission signal for which a duty ratio is set based on the regeneration control signal;
    a storage control part that controls regenerative electric energy supplied to a storage mechanism that stores electric energy to be recovered by the electric motor based on the regenerative permission signal; and
    an operation control part that sets a control mode of the drive or regeneration of the electric motor according to the status of the driven body based on the output of the sensor,
    wherein the electric motor has a movable body constituted from a magnetic body and a plurality of phase coils;
    wherein the operation control part controls one or more of the phase coils for driving and/or regeneration according to the operation status of the driven body;
    wherein, when the driven body is in a low load state, the operation control part performs control so as to simultaneously use a part of the plurality of phase coils for driving and the other phase coils for regeneration; and
    wherein the operation control circuit has a memory that stores a table of combination of the phase coils to be drive controlled or regenerative controlled according to the operation status of the driven body, and refers to the memory to determine the phase coil to be excited or regenerated based on the sensor output.

2. An electric motor operation control circuit that controls the drive and regeneration of an electric motor that drives a driven body, comprising:
    a comparison circuit that compares the phase of a detection signal, which is obtained based on the output of sensor which detects motion of the driven body, and the phase of a reference signal, and forms a drive control signal and a regeneration control signal based on the phase difference;
    a PWM drive control part that forms a drive signal for which a duty ratio is set based on the drive control signal, and supplies the formed drive signal to a drive circuit of the electric motor;
    a regenerative control part that forms a regenerative permission signal for which a duty ratio is set based on the regeneration control signal;
    a storage control part that controls regenerative electric energy supplied to a storage mechanism that stores electric energy to be recovered by the electric motor based on the regenerative permission signal;
    an operation control part that sets a control mode of the drive or regeneration of the electric motor according to the status of the driven body based on the output of the sensor, and
    a magnetic sensor in relation to the movable body for each of the phase coils,
    wherein the electric motor has a movable body constituted from a magnetic body and a plurality of phase coils;
    wherein the operation control part controls one or more of the phase coils for driving and/or regeneration according to the operation status of the driven body; and
    wherein the electric motor operation control circuit determines the hysteresis level in relation to the output of the magnetic sensor based on the comparison result, determines the hysteresis level in relation to that hysteresis level and the output of the magnetic sensor, and determines the duty ratio from the hysteresis level and the magnetic sensor output.

* * * * *